US011435238B2

(12) United States Patent
Makino et al.

(10) Patent No.: US 11,435,238 B2
(45) Date of Patent: Sep. 6, 2022

(54) TEMPERATURE DETECTION DEVICE AND TEMPERATURE DETECTION METHOD

(71) Applicant: Mitsubishi Electric Corporation, Tokyo (JP)

(72) Inventors: Kenzo Makino, Tokyo (JP); Hideaki Arita, Tokyo (JP); Masaya Inoue, Tokyo (JP); Junji Hori, Tokyo (JP); Hiroshi Araki, Tokyo (JP); Yoshitsugu Sawa, Tokyo (JP); Wataru Tsujita, Tokyo (JP)

(73) Assignee: Mitsubishi Electric Cornoration, Tokyo (JP)

( * ) Notice: Subject to any disclaimer, the term of this patent is extended or adjusted under 35 U.S.C. 154(b) by 181 days.

(21) Appl. No.: 16/758,116

(22) PCT Filed: Nov. 24, 2017

(86) PCT No.: PCT/JP2017/042223
§ 371 (c)(1),
(2) Date: Apr. 22, 2020

(87) PCT Pub. No.: WO2019/102586
PCT Pub. Date: May 31, 2019

(65) Prior Publication Data
US 2020/0284664 A1    Sep. 10, 2020

(51) Int. Cl.
G01K 11/22    (2006.01)
G01K 7/32    (2006.01)
(Continued)

(52) U.S. Cl.
CPC ............... G01K 7/32 (2013.01); G01K 1/022 (2013.01); G01K 1/024 (2013.01)

(58) Field of Classification Search
CPC combination set(s) only.
See application file for complete search history.

(56) References Cited

U.S. PATENT DOCUMENTS 4,377,733 A    3/1983    Yamaguchi et al.
6,988,026 B2 *   1/2006    Breed .................... G07C 5/008
                                                                701/31.4

(Continued)

FOREIGN PATENT DOCUMENTS

DE            29 35 271 A1    4/1980
DE    10 2015 001 405 A1    8/2016
(Continued)

OTHER PUBLICATIONS

Office Action dated Aug. 30, 2021 from the German Patent and Trademark Office in DE Application No. 11 2017 008 233.1.
(Continued)

Primary Examiner — Lisa M Caputo
Assistant Examiner — Nasir U. Ahmed
(74) Attorney, Agent, or Firm — Sughrue Mion, PLLC; Richard C. Turner

(57) ABSTRACT

A temperature detection device includes: a detection processing unit configured to transmit a transmission radio wave, simultaneously receive a response radio wave corresponding to the transmission radio wave, and detect whether a temperature of an object to be measured is normal or abnormal based on the response radio wave; and a temperature sensing unit configured to receive the transmission radio wave and transmit the response radio wave responding to the transmission radio wave. The detection processing unit calculates, from the response radio wave received via a second antenna, an amplitude, a phase, or a quadrature phase amplitude of the response radio wave and compares the temperature of the object to be measured to a temperature determined in advance based on a result of the calculation.

13 Claims, 8 Drawing Sheets

(51) Int. Cl.
    *G01K 1/022*     (2021.01)
    *G01K 1/024*     (2021.01)

(56)     References Cited

U.S. PATENT DOCUMENTS

| | | | | |
|---|---|---|---|---|
| 7,456,683 | B2 * | 11/2008 | Takano | H04L 27/3863 |
| | | | | 329/349 |
| 8,240,911 | B1 * | 8/2012 | Pfeifer | G01K 17/00 |
| | | | | 374/117 |
| 9,071,217 | B1 * | 6/2015 | Saito | H03G 3/3047 |
| 10,735,168 | B2 * | 8/2020 | Chaabane | H04W 72/0453 |
| 2009/0147824 | A1 * | 6/2009 | Schafer | G01K 5/18 |
| | | | | 374/183 |
| 2012/0224617 | A1 * | 9/2012 | Feher | H04M 3/382 |
| | | | | 375/222 |
| 2016/0223411 | A1 | 8/2016 | Gebhardt et al. | |
| 2017/0288762 | A1 * | 10/2017 | Miyanaga | H01Q 3/267 |

FOREIGN PATENT DOCUMENTS

| | | |
|---|---|---|
| JP | 3833162 B2 | 10/2006 |
| JP | 5037755 B2 | 10/2012 |
| WO | 2011/081102 A1 | 7/2011 |

OTHER PUBLICATIONS

International Search Report for PCT/JP2017/042223 dated Feb. 20, 2018 [PCT/ISA/210].

Communication dated Nov. 17, 2020 from the Japanese Patent Office in Application No. 2019-556052.

* cited by examiner

BEFORE OFFSET ERROR CORRECTION

AFTER OFFSET ERROR CORRECTION

BEFORE CORRECTION
(BEFORE ROTATION OF COORDINATE SYSTEM)

AFTER CORRECTION
(AFTER ROTATION OF COORDINATE SYSTEM)

TEMPERATURE DETECTION DEVICE AND TEMPERATURE DETECTION METHOD

CROSS REFERENCE TO RELATED APPLICATIONS

This application is a National Stage of International Application No. PCT/JP2017/042223 filed Nov. 24, 2017.

TECHNICAL FIELD

The present invention relates to a temperature detection device and a temperature detection method, and more particularly, to a temperature detection device and a temperature detection method, for transmitting and receiving a radio wave via an antenna through use of a resonance circuit having a resonance characteristic that varies with a temperature to remotely compare a temperature of an object to be measured to a temperature determined in advance.

BACKGROUND ART

In general, it is difficult in most cases to contactlessly detect, in a device including a movable part, a temperature of the movable part.

In Patent Literature 1, it is proposed to contactlessly detect a temperature of an object to be measured through use of a quartz oscillator for temperature measurement. In a related-art device of Patent literature 1, a first quartz oscillator having an oscillating frequency that greatly varies with a temperature variation and a second quartz oscillator having an oscillating frequency that scarcely varies in response to a temperature variation and serving as a reference are arranged in vicinity to each other. The first quartz oscillator functions as a quartz temperature sensor configured to detect the temperature of the object to be measured. From a first oscillation circuit including the first quartz oscillator, a frequency signal corresponding to the temperature of the object to be measured is output. The frequency signal is transmitted to a first frequency division circuit to have its frequency divided at a preset frequency division ratio. Meanwhile, from a second oscillation circuit including the second quartz oscillator serving as the reference, a reference frequency signal serving as a reference is output. The reference frequency signal is transmitted to a second frequency division circuit to have its frequency divided at a preset frequency division ratio. Frequency division signals output from the respective two frequency division circuits are transmitted to a cycle time difference signal generator. The cycle time difference signal generator generates a cycle time difference signal representing a cycle time difference between the two frequency division signals. The cycle time difference signal contains information related to a difference between frequency variations corresponding to temperature variations of the two quartz oscillators. Accordingly, in Patent Literature 1, the temperature of the object to be measured is measured through use of the cycle time difference signal.

Meanwhile, in Patent Literature 2, it is proposed to measure a temperature of a substrate to which a temperature detection element is mounted. The temperature detection element includes a quartz oscillator. From a transmitter toward the substrate, a transmission wave having a frequency corresponding to a natural frequency of the quartz oscillator is transmitted. Consequently, the quartz oscillator resonates at the frequency of the transmission wave. In a configuration described in Patent Literature 2, the transmission performed by the transmitter and reception performed by a receiver alternate, and accordingly the transmitter and the receiver are connected via a switching element. After the quartz oscillator resonates, the transmission of the transmission wave from the transmitter is stopped and switched by the switching element to a receiving operation performed by the receiver. At this time, after the transmission wave was stopped, the quartz oscillator performs damped oscillation at a frequency corresponding to the temperature of the substrate. An electric signal resulting from the damped oscillation is emitted as an electromagnetic wave via a coil. The receiver receives the electromagnetic wave and measures the temperature of the substrate based on a frequency of the received electromagnetic wave.

Meanwhile, in Patent Literature 3, there is proposed a wireless temperature measurement system, which uses a sensor unit mounted to an object to be measured to measure a temperature of the object to be measured. The sensor unit includes a piezo-resonator having an oscillation frequency that varies with a temperature. In addition, an antenna is placed for the sensor unit. The sensor unit and the antenna form a circuit network. A temperature measurement device supplies high-frequency power having a varied frequency to the circuit network and measures a resonance frequency from a frequency characteristic of an intensity of reflected power from the circuit network. The temperature measurement device converts the measured resonance frequency to a temperature, to thereby measure the temperature of the object to be measured.

CITATION LIST

Patent Literature

[PTL 1] JP 5037755 B2
[PTL 2] JP 3833162 B2
[PTL 3] WO 2011/081102 A1

SUMMARY OF INVENTION

Technical Problem

In the related-art device described in Patent Literature 1, the cycle time difference signal at a divided-frequency period is used to detect the temperature of the object to be measured. Accordingly, it is required to wait from a time at which a first divided-frequency period obtained by dividing the oscillation frequency of the first oscillation circuit and a second divided-frequency period obtained by dividing the oscillation frequency of the second oscillation circuit overlap each other to a time at which a cycle time difference signal at a divided-frequency period is generated for the first time, resulting in a problem in that a long time is required for temperature detection.

In the related-art method described in Patent Literature 2, after the transmission of the transmission wave from the transmitter is stopped, the receiver receives the electromagnetic wave from the temperature detection element. Thus, the transmitter and the receiver are switched to each other to be separately used, and accordingly a time for the transmission and a time for the reception are required. Consequently, a problem arises in that a total time required for the transmission/reception is elongated.

In the related-art device described in Patent Literature 3, the frequency of the high-frequency power supplied to the circuit network including the sensor unit and the antenna is varied to implement measurement of the temperature of the object to be measured. An operation of varying the frequency of the high-frequency power is performed through use of a large-sized device to result in a problem of a long operation time and a long time required for data processing for frequency sweep.

Thus, in each of Patent Literatures 1 to 3, a time is required for the temperature detection process, and therefore it is difficult to measure the temperature of the object to be measured with an intended timing.

The present invention has been made to solve the above-mentioned problems, and an object of the present invention is to obtain a temperature detection device and a temperature detection method, which reduce a time required for a temperature detection process, and enable a temperature of an object to be measured to be compared to a temperature determined in advance with an intended timing.

Solution to Problem

According to one embodiment of the present invention, there is provided a temperature detection device including: a detection processing unit configured to transmit, when detecting a temperature of an object to be measured, a transmission radio wave, simultaneously receive a response radio wave corresponding to the transmission radio wave, and detect whether the temperature of the object to be measured is normal or abnormal based on the response radio wave; and a temperature sensing unit configured to receive the transmission radio wave and transmit the response radio wave responding to the transmission radio wave. The temperature sensing unit includes: a resonance circuit, which has a resonance characteristic that varies depending on the temperature of the object to be measured, and is configured to be excited by the transmission radio wave from the detection processing unit to generate the response radio wave responding to the transmission radio wave as a response radio wave on which the resonance characteristic is reflected; and a first antenna configured to transmit the response radio wave generated from the resonance circuit to the detection processing unit. The detection processing unit includes: a second antenna configured to transmit the transmission radio wave to the temperature sensing unit and to receive the response radio wave from the temperature sensing unit; a transmission unit configured to generate the transmission radio wave to be transmitted from the second antenna; a reception unit configured to calculate at least any one of an amplitude, a phase, or a quadrature phase amplitude of the response radio wave received by the second antenna to output the calculated at least one of the amplitude, the phase, or the quadrature phase amplitude as a result of the calculation; and a determination unit configured to compare the temperature of the object to be measured to a temperature determined in advance based on the calculation result received from the reception unit.

ADVANTAGEOUS EFFECTS OF INVENTION

In the temperature detection device according to the present invention, through use of the resonance circuit having the resonance characteristic that varies depending on the temperature of the object to be measured, the transmission radio wave is transmitted to the resonance circuit, the response radio wave corresponding to the transmission radio wave is simultaneously received from the temperature sensing unit, and the temperature of the object to be measured is compared to the temperature determined in advance based on at least any one of the amplitude, the phase, or the quadrature phase amplitude of the response radio wave. Accordingly, by performing the transmission and the reception in parallel, it is possible to reduce the time required for the temperature detection process and compare the temperature of the object to be measured to the temperature determined in advance with the intended timing.

DESCRIPTION OF EMBODIMENTS

Figure 1:
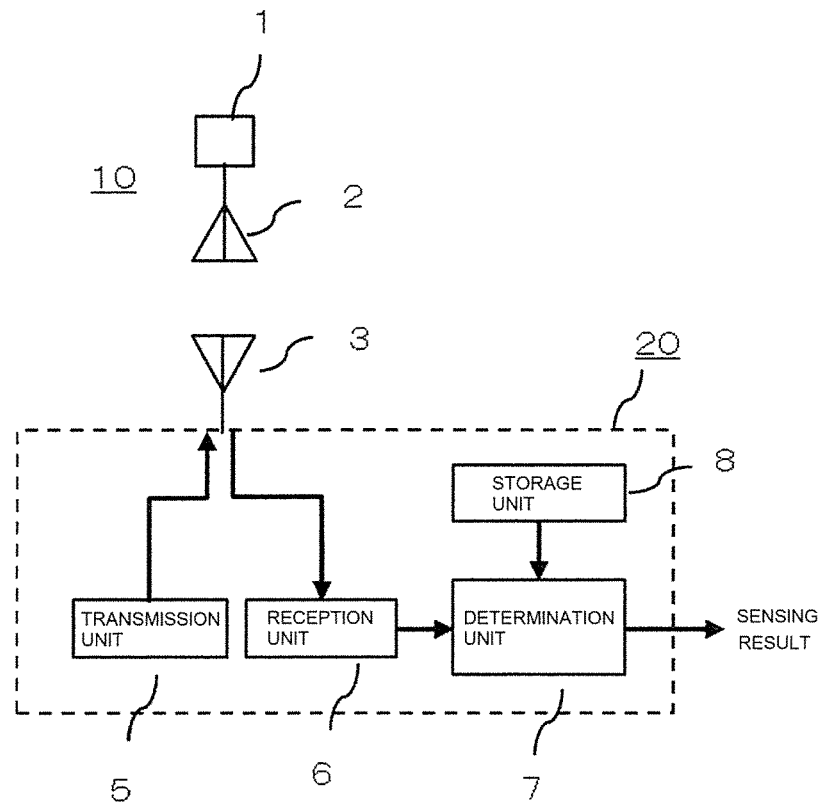
FIG. 1 is a block diagram for illustrating a configuration of a temperature detection device according to a first embodiment of the present invention.

Referring to the drawings, a description is given below of a temperature detection device and a temperature detection method according to embodiments of the present invention. Note that, in each of the drawings, like or equivalent configurations are denoted by like reference numerals added thereto.

First Embodiment

FIG. 1 is a block diagram for illustrating a configuration of a temperature detection device according to a first embodiment of the present invention.

A temperature detection device according to the first embodiment includes a temperature sensing unit 10 and a detection processing unit 20.

The temperature sensing unit 10 includes a first resonance circuit 1 and a first antenna 2.

The first antenna 2 receives a transmission radio wave transmitted from the detection processing unit 20 and transmits a response radio wave to the detection processing unit 20.

The first resonance circuit 1 is excited by the transmission radio wave from the detection processing unit 20 that has been received by the first antenna 2 to generate the response radio wave responding to the transmission radio wave. The first resonance circuit 1 has a resonance characteristic that varies depending on a temperature. Accordingly, an electrical oscillation state of the first resonance circuit 1 varies with a temperature of an object to be measured. Consequently, the response radio wave transmitted from the first antenna 2 is affected by the variation of the electrical oscillation state of the first resonance circuit 1 so that at least one of an amplitude, a phase, or a quadrature phase amplitude of the response radio wave varies. Thus, the response radio wave transmitted from the first antenna 2 has characteristics in which at least one of characteristics, namely, the amplitude, the phase, and the quadrature phase amplitude varies with the temperature of the object to be measured.

The detection processing unit 20 includes a second antenna 3, a transmission unit 5, a reception unit 6, and a determination unit 7. In the determination unit 7, when a threshold value is used, the threshold value is stored in advance in a storage unit 8. The storage unit 8 is not necessarily required to be provided, and may also be provided as required.

The second antenna 3 transmits the transmission radio wave to the temperature sensing unit 10 and receives the response radio wave transmitted from the temperature sensing unit 10.

The transmission unit 5 generates a transmission radio wave having a specific carrier frequency and transmits the transmission radio wave toward the first antenna 2 of the temperature sensing unit 10 via the second antenna 3.

The reception unit 6 calculates at least one of the amplitude, the phase, or the quadrature phase amplitude of the response radio wave received by the second antenna 3 and transmits the calculated amplitude, phase, or quadrature phase amplitude to the determination unit 7. The reception unit 6 may also calculate only one of the amplitude, the phase, and the quadrature phase amplitude of the response radio wave. A method of calculating only one of the amplitude, the phase, and the quadrature phase amplitude is described later in second to eighth embodiments of the present invention.

The determination unit 7 detects whether the temperature of the object to be measured is normal or abnormal based on at least one of the amplitude, the phase, or the quadrature phase amplitude of the response radio wave output from the reception unit 6. As a detection method, for example, at least one of the amplitude, the phase, or the quadrature phase amplitude of the response radio wave output from the reception unit 6 is compared to a corresponding threshold value stored in advance in the storage unit 8. Through the comparison, it is possible to detect whether or not the temperature of the object to be measured exceeds a preset threshold temperature. When the temperature of the object to be measured is lower than the threshold temperature, the determination unit 7 determines that the temperature of the object to be measured is normal. When the temperature of the object to be measured exceeds the threshold temperature, the determination unit 7 determines that the temperature of the object to be measured is abnormal. The detection method for detecting whether the temperature of the object to be measured is normal or abnormal is not limited thereto. Another detection method is described later in the second to eighth embodiments. The determination unit 7 may also perform the comparison process described above and output a result of the comparison to the outside. Alternatively, the determination unit 7 may also detect whether the temperature of the object to be measured is normal or abnormal based on a result of the comparison process and output a result of the detection to the outside. The temperature of the object to be measured is not necessarily required to be compared to the threshold temperature, and may also be compared to any temperature determined in advance.

Next, a description is given of an operation of the temperature detection device according to the first embodiment.

In the detection processing unit 20, the transmission unit 5 generates the transmission radio wave having the specific carrier frequency and transmits the transmission radio wave toward the first antenna 2 of the temperature sensing unit 10 via the second antenna 3. Meanwhile, the reception unit 6 receives the response radio wave responding to the transmitted transmission radio wave from the temperature sensing unit 10. In the first embodiment, in the detection processing unit 20, the transmission of the transmission radio wave and the reception of the response radio wave are simultaneously performed in parallel.

Figure 2:
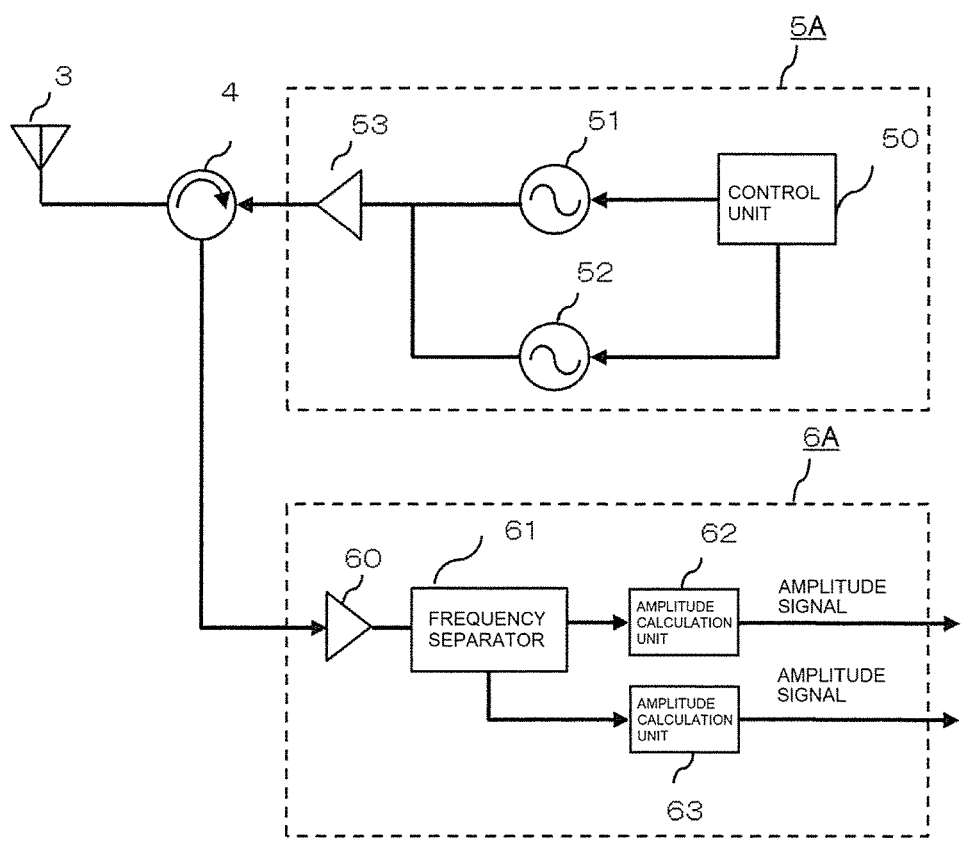
FIG. 2 is a block diagram for illustrating respective configurations of a transmission unit and a reception unit of a detection processing unit in a temperature detection device according to a second embodiment of the present invention.

In FIG. 1, a transmission/reception antenna is used as the second antenna 3. However, the second antenna 3 is not limited to the transmission/reception antenna in this case. As the second antenna 3, a transmission antenna and a reception antenna may also be provided separately. When the second antenna 3 formed of the transmission/reception antenna is used, the use of, for example, a circulator enables the received response radio wave to be retrieved. Accordingly, as illustrated in FIG. 2 described later, it is appropriate to provide a circulator 4 as required between the second antenna 3 and each of the transmission unit 5 and the reception unit 6.

As described above, the resonance characteristic of the first resonance circuit 1 provided in the temperature sensing unit 10 varies depending on the temperature. Accordingly, the response radio wave radiated from the first resonance circuit 1 toward the detection processing unit 20 via the first antenna 2 has at least one of the characteristics, namely, the amplitude, the phase, and the quadrature phase amplitude that varies with the temperature of the object to be measured.

In the detection processing unit 20, the reception unit 6 calculates at least one of the amplitude, the phase, or the quadrature phase amplitude of the response radio wave received by the second antenna 3. The reception unit 6 outputs at least one of the amplitude, the phase, or the quadrature phase amplitude of the response radio wave that has been calculated to the determination unit 7. The determination unit 7 compares such values to respective threshold values stored in advance in the storage unit 8. Through the comparison, it is possible to determine whether the temperature of the object to be measured is normal or abnormal, or determine whether or not the temperature of the object to be measured is equal to or higher than a temperature determined in advance.

As described above, in the first embodiment, the detection processing unit 20 transmits the transmission radio wave having the specific carrier frequency to the temperature sensing unit 10, simultaneously calculates at least one of the amplitude, the phase, or the quadrature phase amplitude of the response radio wave, and compares the temperature of the object to be measured to the threshold temperature based on a result of the calculation. Thus, in the first embodiment, while the transmission radio wave is transmitted, the temperature of the object to be measured is detected, and therefore it is possible to simultaneously perform the transmission and the reception in parallel. Accordingly, the time required for the transmission/reception of the radio wave can significantly be reduced to at most ½ of that required for the transmission/reception of the radio wave in the related-art device described above in Patent Literature 2, in which the transmission and the reception are switched to each other and individually performed. As a result, in the first embodiment, even when the object to be measured is, for example, a motor rotating at high speed and a state of the object to be measured varies from moment to moment, it is possible to detect whether or not the temperature of the object to be measured is equal to or higher than the threshold temperature with an intended timing.

Further, in the first embodiment, as the carrier frequency of the transmission radio wave transmitted from the detection processing unit 20, only one frequency is used, and it is not required to vary the frequency during temperature detection unlike in the description of Patent Literature 3 given above. Therefore, it is possible to simplify a configuration of the detection processing unit 20, and an operation, for example, frequency sweep, is not required.

Second Embodiment

FIG. 2 is a block diagram for illustrating a part of a configuration of the detection processing unit 20 in a temperature detection device according to the second embodiment of the present invention. The overall configuration of the temperature detection device according to the second embodiment is basically the same as the configuration illustrated in FIG. 1, and accordingly a description thereof is omitted herein. In the second embodiment, a reception unit 6A of the detection processing unit 20 calculates only an amplitude of a response radio wave.

In FIG. 2, of the configuration of the detection processing unit 20, only configurations of the second antenna 3, a transmission unit 5A, and the reception unit 6A are illustrated. The transmission unit 5A and the reception unit 6A are provided instead of the transmission unit 5 and the reception unit 6 of FIG. 1, and perform operations different from those to be performed by the transmission unit 5 and the reception unit 6.

As illustrated in FIG. 2, in the second embodiment, the transmission unit 5A includes a control unit 50, a first local oscillator 51, a second local oscillator 52, and an amplifier 53.

A description is given below of each of the components of the transmission unit 5A.

The control unit 50 controls operations of the first and second local oscillators 51 and 52. The control unit 50 sets carrier frequencies f1 and f2 of transmission radio waves to be generated from the first local oscillator 51 and the second local oscillator 52. A method of determining values of the carrier frequencies f1 and f2 is described later with reference to FIG. 3.

The first local oscillator 51 generates a first transmission radio wave having the first carrier frequency f1.

The second local oscillator 52 generates a second transmission radio wave having the second carrier frequency f2.

The first transmission radio wave generated from the first local oscillator 51 and the second transmission radio wave generated from the second local oscillator 52 are multiplexed and input to the amplifier 53. In FIG. 2, a configuration for the multiplexing is not shown, but, actually, a device, for example, the amplifier 53, is placed as required in a stage preceding the amplifier 53. The amplifier 53 amplifies the multiplexed first and second transmission radio waves and outputs the amplified transmission radio wave.

The second antenna 3 transmits the transmission radio wave amplified by the amplifier 53 toward the first antenna 2 of the temperature sensing unit 10.

As illustrated in FIG. 2, the reception unit 6A includes an amplifier 60, a frequency separator 61, a first amplitude calculation unit 62, and a second amplitude calculation unit 63.

A description is given below of each of the components of the reception unit 6A.

The amplifier 60 amplifies the response radio wave received from the temperature sensing unit 10 via the second antenna 3.

When the transmission of the transmission radio wave and the reception of the response radio wave are performed through use of the shared second antenna 3, it is possible to retrieve the response radio wave by using, for example, the circulator 4. Accordingly, as illustrated in FIG. 2, the circulator 4 is connected between the second antenna 3 and each of the transmission unit 5A and the reception unit 6A.

The frequency separator 61 separates the response radio wave amplified by the amplifier 60 into radio waves having individual frequencies. Specifically, the frequency separator 61 separates the response radio wave into a second response radio wave having the first carrier frequency f1 and a second response radio wave having the second carrier frequency f2. The first response radio wave is input to the first amplitude calculation unit 62, and the second response radio wave is input to the second amplitude calculation unit 63.

The first amplitude calculation unit 62 calculates an amplitude of the first response radio wave.

The second amplitude calculation unit 63 calculates an amplitude of the second response radio wave.

The two amplitudes calculated by the first and second amplitude calculation units 62 and 63 are input to the determination unit 7 and compared to each other.

Next, a description is given of an operation of the temperature detection device according to the second embodiment.

First, in the transmission unit 5A of the detection processing unit 20, the first and second local oscillators 51 and 52 generate the respective transmission radio waves having the first and second carrier frequencies f1 and f2. Those transmission radio waves are multiplexed, amplified by the amplifier 53, and transmitted toward the temperature sensing unit 10.

The temperature sensing unit 10 receives the transmission radio wave via the first antenna 2. The first resonance circuit 1 is driven by the transmission radio wave to output the response radio wave. The response radio wave is transmitted toward the second antenna 3 of the detection processing unit 20 via the first antenna 2.

The detection processing unit 20 receives the response radio wave via the second antenna 3. The received response radio wave is input to the reception unit 6A via the circulator 4.

In the reception unit 6A, the amplifier 60 amplifies the response radio wave, and the frequency separator 61 separates the amplified response radio wave into radio waves individually having the carrier frequencies f1 and f2.

The first and second response radio waves resulting from the separation of the radio wave by the frequency separator 61 are input to the first and second amplitude calculation units and 63, respectively. The first and second amplitude calculation units 62 and 63 calculate the amplitudes of the first and second response radio waves. The two calculated amplitudes are input to the determination unit 7. The determination unit 7 compares the amplitude of the first response radio wave to the amplitude of the second response radio wave to determine a magnitude relationship therebetween, to thereby sense whether the temperature of the object to be measured is normal or abnormal. A sensing method based on the magnitude relationship between the amplitudes is described later with reference to FIG. 3.

The description has been given above of the case in which the transmission unit 5A includes the two local oscillators 51 and 52, and the reception unit 6A includes the two amplitude calculation units 62 and 63. However, the configurations of the transmission unit 5A and the reception unit 6A are not limited to those in that case. It may also be possible that the transmission unit 5A includes one local oscillator, and the reception unit 6A includes one amplitude calculation unit. In that case, the generation and transmission of the first and second frequencies f1 and f2 in the transmission unit 5A are performed by being temporally switched to each other under the control of the control unit 50.

Figure 3:
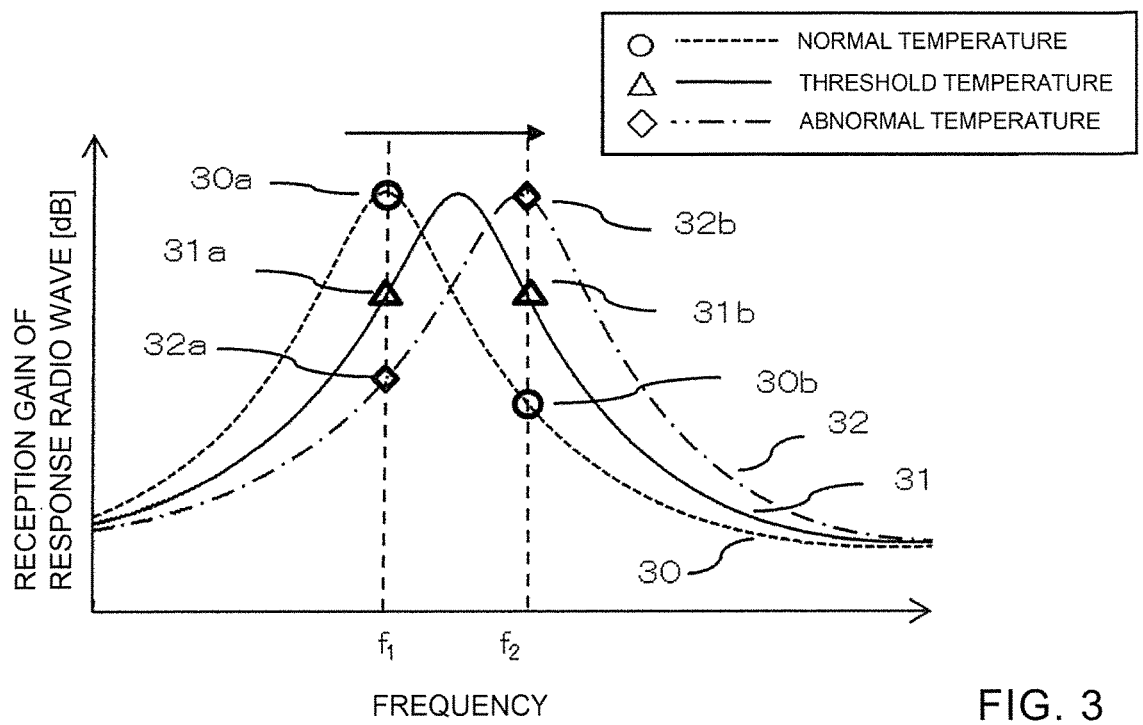
FIG. 3 is a schematic graph for illustrating a method of setting a carrier frequency of a transmission radio wave in the temperature detection device according to the second embodiment of the present invention.

Next, referring to FIG. 3, a description is given of a method of setting the first and second carrier frequencies f1 and f2 and of a temperature detection method based on the magnitude relationship between the amplitudes of the response radio waves in the temperature detection device according to the second embodiment. FIG. 3 is a schematic graph for illustrating those methods in the temperature detection device according to the second embodiment.

In FIG. 3, the abscissa axis represents a frequency, and the ordinate axis represents a reception gain of the response radio wave, that is, the amplitude of the response radio wave. In FIG. 3, frequency dependence of the reception gain of the response radio wave is shown.

The first resonance circuit 1 has the resonance characteristic that varies depending on a temperature. Accordingly, for example, a resonance frequency varies depending on the temperature. In that case, the reception gain of the response radio wave responding to the transmission radio wave varies with the temperature, as shown in FIG. 3. In FIG. 3, a broken line 30 represents the reception gain at a time when the object to be measured is at a normal temperature, a solid line 31 represents the reception gain at a time when the object to be measured is at a threshold temperature, and a dot-dash line 32 represents the reception gain at a time when the object to be measured is at an abnormal temperature.

In the second embodiment, whether the temperature of the object to be measured is normal or abnormal is determined through use of the frequency dependence of the reception gain of the response radio wave.

Accordingly, in the second embodiment, the amplitudes of the transmission radio waves at the two carrier frequencies f1 and f2 are adjusted to be substantially equal, and then the respective amplitudes of the response radio waves at the individual carrier frequencies f1 and f2 are calculated. Subsequently, those amplitudes are compared to each other to enable a frequency range in which the resonance frequency of the first resonance circuit 1 is present to be identified. The following is a specific description thereof.

It is assumed herein that, in FIG. 3, the first carrier frequency f1 is set to the resonance frequency of the first resonance circuit 1 at the time when the temperature of the object to be measured is normal, and the second carrier frequency f2 is set to the resonance frequency of the first resonance circuit 1 at the time when the temperature of the object to be measured is abnormal. At this time, when the object to be measured is at the normal temperature, the reception gain of each of the response radio waves is consequently the same as or similar to that represented by the broken line 30 of FIG. 3. Meanwhile, when the object to be measured is at the abnormal temperature, the reception gain of each of the response radio waves is consequently the same as or similar to that represented by the dot-dash line 32 of FIG. 3. The normal temperature of the object to be measured indicates a case in which the temperature of the object to be measured is lower than the threshold temperature, and the abnormal temperature of the object to be measured indicates a case in which the temperature of the object to be measured is equal to or higher than the threshold temperature.

Accordingly, after the respective amplitudes of the transmission radio waves at the individual carrier frequencies f1 and f2 are adjusted to be substantially equal, the first and second amplitude calculation units 62 and 63 calculate the amplitudes of the first and second response radio waves. At this time, when the temperature of the object to be measured has a normal value, the amplitude of each of the response radio waves is consequently the same as that of the broken line 30. Therefore, in that case, the amplitude of the first response radio wave at the carrier frequency f1 has a value 30a, and the amplitude of the second response radio wave responding to the transmission radio wave at the carrier frequency f2 has a value 30b. In this case, the value 30a is larger than the value 30b. Accordingly, when the value 30a and the value 30b are compared to each other and when the value 30a is larger, it can be determined that the temperature of the object to be measured is normal. As a result, the determination unit 7 compares the amplitude calculated by the first amplitude calculation unit 62 to the amplitude calculated by the second amplitude calculation unit 63, and determines that the temperature of the object to be measured is normal when the amplitude calculated by the first amplitude calculation unit 62 is larger than the amplitude calculated by the second amplitude calculation unit 63.

Meanwhile, when the amplitude of each of the response radio waves is consequently the same as that of the dot-dash line 32, the amplitude of the response radio wave at the carrier frequency f1 has a value 32a, and the amplitude of the response radio wave at the carrier frequency f2 has a value 32b. In this case, the value 32a is smaller than the value 32b. Accordingly, when the value 32a and the value 32b are compared to each other and when the value 32a is smaller, it can be determined that the temperature of the object to be measured is abnormal. As a result, the determination unit 7 compares the amplitude calculated by the first amplitude calculation unit 62 to the amplitude calculated by the second amplitude calculation unit 63, and determines that the temperature of the object to be measured is abnormal when the amplitude calculated by the first amplitude calculation unit 62 is smaller than the amplitude calculated by the second amplitude calculation unit 63.

It is assumed that a middle value between the normal temperature and the abnormal temperature is the threshold temperature. Accordingly, the first and second frequencies f1 and f2 are set so that a middle frequency ((f1+f2)/2) between the first and second carrier frequencies f1 and f2 becomes the resonance frequency of the first resonance circuit 1. The threshold temperature is a temperature to be used to determine that the temperature of the object to be measured is abnormal when the temperature of the object to be measured exceeds the threshold temperature, and to determine that the temperature of the object to be measured is normal when the temperature of the object to be measured is lower than the threshold temperature. The threshold temperature is determined appropriately in advance from, for example, a limit temperature, a rated temperature, and a heat resistance of the object to be measured.

At this time, when the temperature of the object to be measured is the threshold temperature, the reception gain of each of the response radio waves is consequently the same as or similar to that represented by the solid line 31. As a result, the amplitude of the response radio wave at the frequency f1 has a value 31a, and the amplitude of the response radio wave at the frequency f2 has a value 31b. In this case, the value 31a and the value 32b are the same. Accordingly, when the value 31a and the value 31b are compared to each other and when the value 31a and the value 31b are the same or a difference between the value 31a and the value 31b is smaller than a preset threshold value, it can be determined that the temperature of the object to be measured is the threshold temperature. As a result, the determination unit 7 compares the amplitude calculated by the first amplitude calculation unit 62 to the amplitude calculated by the second amplitude calculation unit 63 and determines that the temperature of the object to be measured is the threshold temperature when the amplitude calculated by the first amplitude calculation unit 62 is the same as the amplitude calculated by the second amplitude calculation unit 63 or an absolute value of the difference between those amplitudes is smaller than the threshold value.

Thus, in the second embodiment, the first carrier frequency f1 is set to the resonance frequency of the first resonance circuit 1 at the time when the object to be measured is at the normal temperature. As a result, it is possible to easily determine that the temperature of the object to be measured is normal from the amplitude of the response radio wave at the frequency f1.

Further, in the second embodiment, the second carrier frequency f2 is set to the resonance frequency of the first resonance circuit 1 at the time when the object to be measured is at the abnormal temperature. As a result, it is possible to easily determine that the temperature of the object to be measured is abnormal from the amplitude of the response radio wave at the frequency f2.

In addition, the middle frequency ((f1+f2)/2) between the first and second frequencies f1 and f2 is set to the resonance frequency of the first resonance circuit 1 at the time when the object to be measured is at the threshold temperature. As a result, it is possible to determine whether or not the temperature of the object to be measured is equal to or higher than the threshold temperature. Specifically, as shown in FIG. 3, when a value of the reception gain at the frequency f2 is smaller than a value of the reception gain at the frequency f1, namely, when the reception gains at the frequency f1 and the frequency f2 are as represented by the broken line 30, it can be determined that the temperature of the object to be measured is lower than the threshold temperature. Meanwhile, when the value of the reception gain at the frequency f2 is larger than the value of the reception gain at the frequency f1, namely, when the reception gains at the frequency f1 and the frequency f2 are as represented by the dot-dash line 32, it can be determined that the temperature of the object to be measured is higher than the threshold temperature. Meanwhile, when the value of the reception gain at the frequency f1 is equal to the value of the reception gain at the frequency f2, namely, when the reception gains at the frequency f1 and the frequency f2 are as represented by the solid line 31, it can be determined that the temperature of the object to be measured is equal to the threshold temperature.

As described above, in the second embodiment also, in the same manner as in the first embodiment, the temperature of the object to be measured is detected, while the transmission radio wave is transmitted. Therefore, it is possible to obtain the same effect of being able to reduce the temperature detection time as obtained in the first embodiment.

Further, in the second embodiment, the two frequencies f1 and f2 are used as the carrier frequency of the transmission radio wave, the amplitudes of the response radios waves are calculated for the individual frequencies f1 and f2, and whether or not the temperature of the object to be measured is equal to or higher than the threshold temperature is determined based on a result of the comparison between those amplitudes. Thus, the temperature of the object to be measured is detected based on the result of the comparison between the amplitudes at the two carrier frequencies. As a result, it is possible to obtain an effect of remaining unaffected by a variation of an intensity of the transmission radio wave even when the intensity of the transmission radio wave varies.

The resonance frequencies of the first resonance circuit 1 at the time when the temperature of the object to be measured is normal, when the temperature of the object to be measured is abnormal, and when the object to be measured is at the threshold temperature are measured in advance by, for example, an experiment, and the obtained measurement values are used.

Third Embodiment

Figure 4:
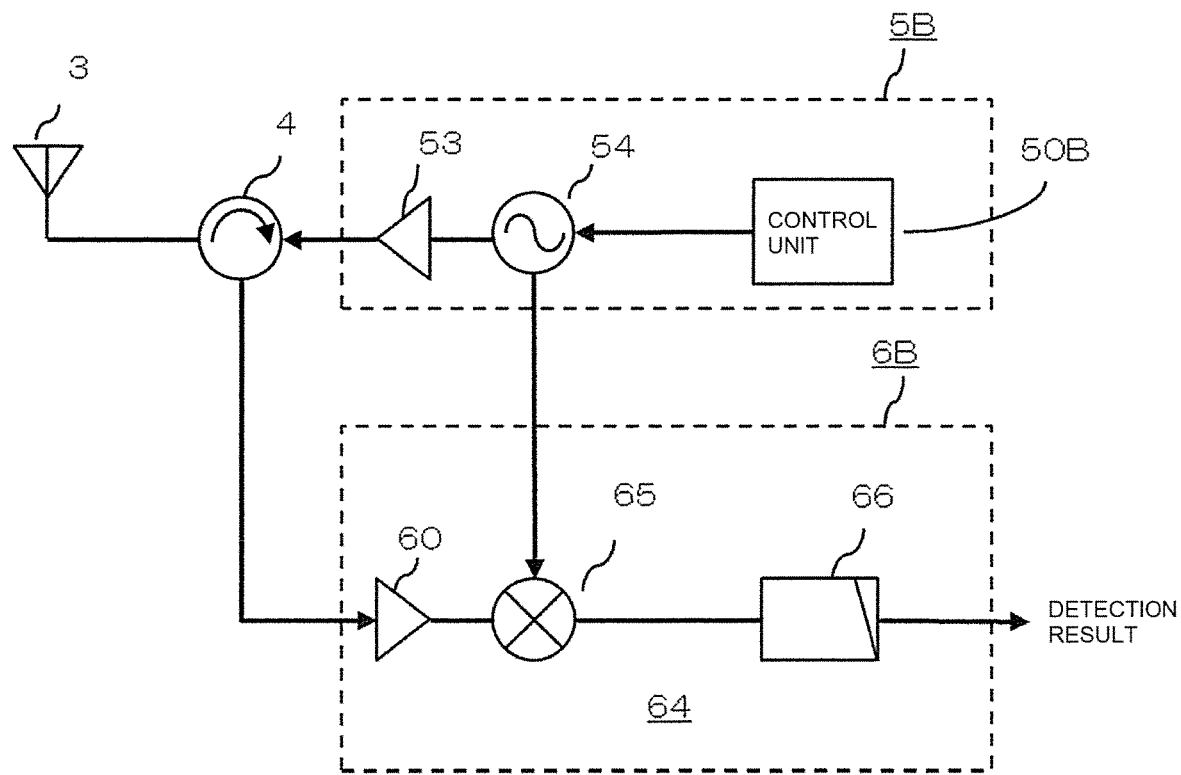
FIG. 4 is a block diagram for illustrating respective configurations of a transmission unit and a reception unit of a detection processing unit in a temperature detection device according to a third embodiment of the present invention.

FIG. 4 is a block diagram for illustrating a part of a configuration of the detection processing unit 20 in a temperature detection device according to the third embodiment of the present invention. The overall configuration of the temperature detection device according to the third embodiment is basically the same as the configuration illustrated in FIG. 1, and accordingly a description thereof is omitted herein. In the third embodiment, a reception unit 6B of the detection processing unit 20 calculates only a quadrature phase amplitude of a response radio wave.

In FIG. 4, of the configuration of the detection processing unit 20, only configurations of the second antenna 3, a transmission unit 5B, and the reception unit 6B are illustrated. The transmission unit 5B and the reception unit 6B are provided instead of the transmission unit 5 and the reception unit 6 of FIG. 1, and perform operations different from those to be performed by the transmission unit 5 and the reception unit 6.

As illustrated in FIG. 4, in the third embodiment, the transmission unit 5B includes a control unit 50B, a local oscillator 54, and the amplifier 53. In the second embodiment described above, as illustrated in FIG. 2, the two local oscillators are provided, but, in the third embodiment, only one local oscillator is provided.

A description is given below of each of the components of the transmission unit 5B.

The control unit 50B controls an operation of the local oscillator 54. The control unit 50B sets a carrier frequency f of a transmission radio wave to be generated from the local oscillator 54.

The local oscillator 54 generates the transmission radio wave having the carrier frequency f set at a present time by the control unit 50B. A method of determining a value of the carrier frequency f is described later with reference to FIG. 5A and FIG. 5B.

The transmission radio wave generated from the local oscillator 54 is input to the amplifier 53. The amplifier 53 amplifies the transmission radio wave and outputs the amplified transmission radio wave.

The second antenna 3 transmits the transmission radio wave amplified by the amplifier 53 toward the first antenna 2 of the temperature sensing unit 10.

Further, as illustrated in FIG. 4, the reception unit 6B includes the amplifier 60 and a quadrature phase amplitude calculation unit 64.

A description is given below of each of the components of the transmission unit 6B.

The amplifier 60 amplifies the response radio wave received from the temperature sensing unit 10 via the second antenna 3.

When the transmission of the transmission radio wave and the reception of the response radio wave are performed through use of the shared second antenna 3, it is possible to retrieve the response radio wave by using, for example, the circulator 4. Accordingly, as illustrated in FIG. 4, the circulator 4 is connected between the second antenna 3 and each of the transmission unit 5B and the reception unit 6B.

As illustrated in FIG. 4, the quadrature phase amplitude calculation unit 64 includes a mixer 65 and a low-pass filter 66. The mixer 65 functions as a frequency converter configured to convert a high frequency to a low frequency. The quadrature phase amplitude calculation unit 64 calculates a quadrature phase amplitude of the response radio wave. As a calculation method, first, the mixer 65 multiplies the response radio wave amplified by the amplifier 60 by the transmission radio wave generated from the local oscillator 54 of the transmission unit 5B to mix the amplified response radio wave with the transmission radio wave, to thereby generate a differential frequency signal representing a frequency difference between the transmission radio wave and the response radio wave. A frequency of the differential frequency signal is a low frequency, and is therefore easy to handle in a circuit. Then, the generated differential frequency signal is input to the low-pass filter 66 to pass therethrough to be extracted. The differential frequency signal serves as an amplitude of a quadrature-phase component of the response radio wave, which is a so-called Q-component. The differential frequency signal is hereinafter referred to as "quadrature phase amplitude of the response radio wave". The quadrature phase amplitude is equivalent to a complex amplitude having information on both of an amplitude and a phase.

The quadrature phase amplitude of the response radio wave calculated by the quadrature phase amplitude calculation unit 64 is input to the determination unit 7. The determination unit 7 compares the quadrature phase amplitude to a threshold value stored in advance in the storage unit 8 to determine whether or not the temperature of the object to be measured exceeds a threshold temperature and detect whether the temperature of the object to be measured is normal or abnormal.

As described above, in the third embodiment, the calculated quadrature phase amplitude and the threshold value are compared with each other, to thereby determine whether or not the temperature of the object to be measured exceeds the threshold temperature to detect a temperature abnormality.

In the description given above, as a method of calculating the quadrature phase amplitude in the quadrature phase amplitude calculation unit 64, the quadrature phase amplitude method using the mixer 65 and the low-pass filter 66 is implemented, but the method of calculating the quadrature phase amplitude in the quadrature phase amplitude calculation unit 64 is not limited to that implemented in this case. As the method of calculating the quadrature phase amplitude in the quadrature phase amplitude calculation unit 64, there are other calculation methods, for example, quadrature detection, undersampling, and heterodyne detection using a middle frequency, and any of those methods may also be used appropriately.

Figure 5A:
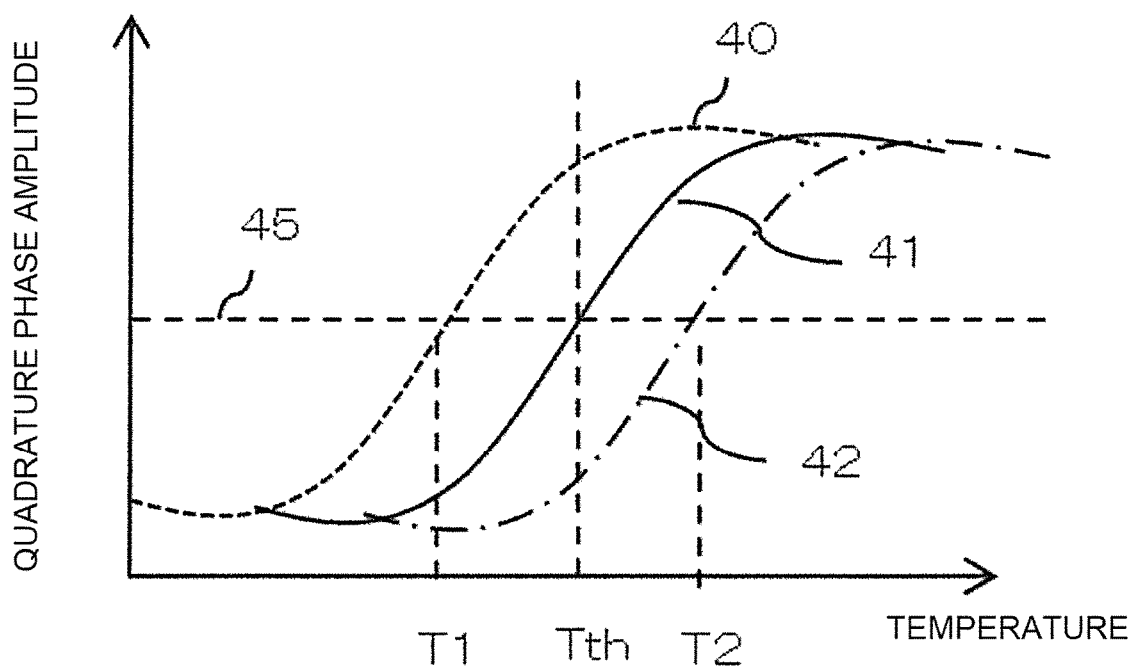
FIG. 5A is a schematic graph for illustrating a method of setting a carrier frequency of a transmission radio wave in the temperature detection device according to the third embodiment of the present invention.
Figure 5B:
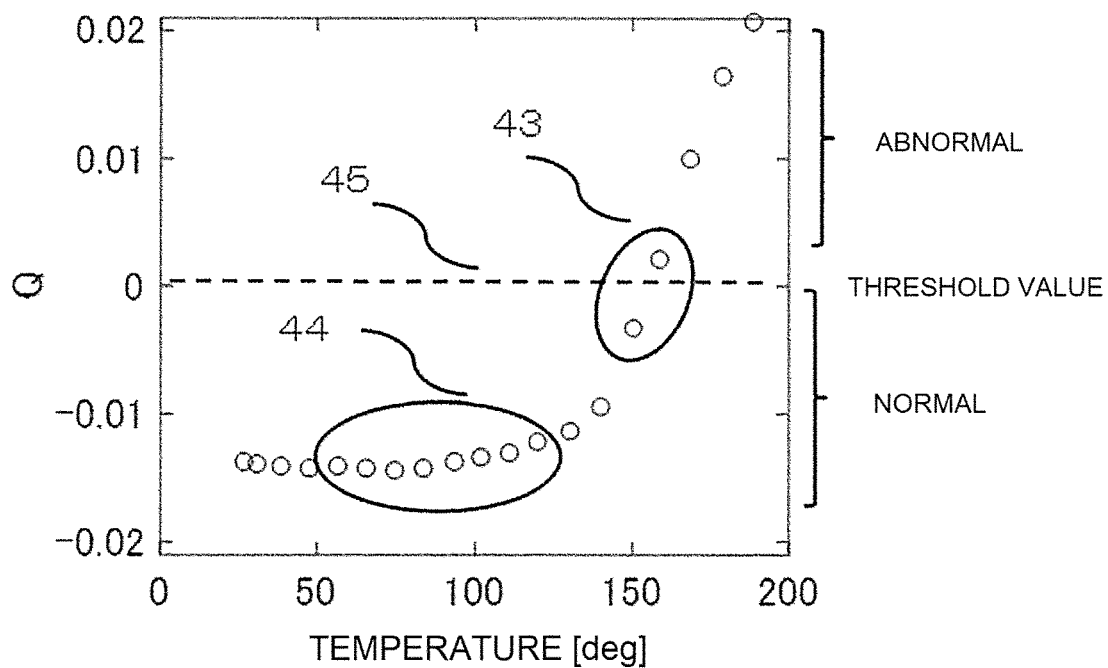
FIG. 5B is a schematic graph for illustrating the method of setting the carrier frequency of the transmission radio wave in the temperature detection device according to the third embodiment of the present invention.

Next, referring to FIG. 5A and FIG. 5B, a description is given of a method of setting the carrier frequency f of the transmission radio wave and a temperature detection method based on the quadrature phase amplitude in the temperature detection device according to the third embodiment. FIG. 5A is a schematic graph for illustrating the method of setting the carrier frequency f and the temperature detection method based on the quadrature phase amplitude in the temperature detection device according to the third embodiment. FIG. 5B is an explanatory graph for illustrating a correspondence relationship between the quadrature phase amplitude and the temperature.

In each of FIG. 5A and FIG. 5B, the abscissa axis represents a temperature. The ordinate axis represents the quadrature phase amplitude of the response radio wave, that is, the Q-component. In each of FIG. 5A and FIG. 5B, temperature dependence of the quadrature phase amplitude of the response radio wave is shown.

The first resonance circuit 1 of the temperature sensing unit 10 has the resonance characteristic that varies depending on the temperature. Accordingly, when, for example, the resonance frequency varies, the quadrature phase amplitude of the response radio wave responding to the transmission radio wave varies with the temperature of the object to be measured, as shown in FIG. 5A. In FIG. 5A, each of a broken line 40, a solid line 41, and a dot-dash line 42 represents the temperature dependence of the quadrature phase amplitude at the time when the frequency f of the transmission radio wave is varied.

In the third embodiment, as shown in FIG. 5B, when the quadrature phase amplitude is equal to or larger than a threshold value 45, it is determined that the temperature of the object to be measured is abnormal and, when the quadrature phase amplitude is smaller than the threshold value 45, it is determined that the temperature of the object to be measured is normal.

As shown in FIG. 5B, there are a region 43, in which the quadrature phase amplitude varies to rapidly increase with a temperature rise, and a region 44, in which an amount of the variation of the quadrature phase amplitude is small. Accordingly, when the threshold value 45 is set correspondingly to the region 43, it is possible to clearly determine normality/abnormality to increase a detection sensitivity. However, when the threshold value 45 is set correspondingly to a region other than the region 43, the amount of the variation of the quadrature phase amplitude is small. Consequently, the detection sensitivity of the normal/abnormal determination lowers, and erroneous determination may be made in some cases.

However, as shown in FIG. 5A, a result of the detection of the quadrature phase amplitude varies with the frequency f of the transmission radio wave. As indicated by the broken line 40, the quadrature phase amplitude in a case in which the frequency f of the transmission radio wave is set to the resonance frequency at the time when the object to be measured is at the normal temperature greatly varies before and after a temperature T1. Meanwhile, as indicated by the solid line 41, the quadrature phase amplitude in a case in which the frequency f of the transmission radio wave is set to the resonance frequency at the time when the object to be measured is at the threshold temperature greatly varies before and after a threshold temperature Tth. Meanwhile, as indicated by the dot-dash line 42, the quadrature phase amplitude in a case in which the frequency f of the transmission radio wave is set to the resonance frequency at the time when the object to be measured is at the abnormal temperature greatly varies before and after a temperature T2. Therefore, it is desired that the carrier frequency f of the transmission radio wave be varied so that the region in which the quadrature phase amplitude greatly varies with the temperature of the object to be measured is located just before and after the threshold value 45.

When, in FIG. 5A, the frequency f of the transmission radio wave is set to the resonance frequency of the first resonance circuit 1 at the time when the object to be measured is at the normal temperature, the quadrature phase amplitude varies as indicated by the broken line 40. Further, when the frequency f of the transmission radio wave is set to the resonance frequency of the first resonance circuit 1 at the time when the object to be measured is at the threshold temperature, the quadrature phase amplitude varies as indicated by the solid line 41. Further, when the frequency f of the transmission radio wave is set to the resonance frequency of the first resonance circuit 1 at the time when the object to be measured is at the abnormal temperature, the quadrature phase amplitude varies as indicated by the dot-dash line 42.

When the carrier frequency f of the transmission radio wave is thus detuned in a negative direction or in a positive direction from the resonance frequency of the first resonance circuit 1 at the threshold temperature, the temperature dependence varies as shown in FIG. 5A. Accordingly, as shown in FIG. 5A, by adjusting the carrier frequency f of the transmission radio wave, it is possible to change a temperature at which the transmission radio wave resonates with the first resonance circuit 1. Specifically, when the carrier frequency f of the transmission radio wave is detuned in the negative direction, the quadrature phase amplitude greatly varies at the temperature T1. Meanwhile, when the frequency f of the transmission radio wave is detuned in the positive direction, the quadrature phase amplitude greatly varies at the temperature T2.

Therefore, in the third embodiment, the carrier frequency f of the transmission radio wave is set to the resonance frequency of the first resonance circuit 1 at the time when the object to be measured is at the normal temperature, to thereby enable the sensitivity of the detection of a temperature variation at the time when the object to be measured is at the normal temperature to be increased.

In addition, by setting the carrier frequency f of the transmission radio wave to the resonance frequency of the first resonance circuit 1 at the time when the object to be measured is at the abnormal temperature, it is possible to increase the sensitivity of the detection of a temperature variation at the time when the object to be measured is at the abnormal temperature.

Moreover, by setting the carrier frequency f of the transmission radio wave to the resonance frequency of the first resonance circuit 1 at the time when the object to be measured is at the threshold temperature, it is possible to increase the sensitivity of the detection of a temperature variation at the time when the object to be measured is at the threshold temperature. Further, in this case, it is possible to easily determine whether a measured temperature of the object to be measured exceeds the threshold temperature.

In summary, in the third embodiment, in a case in which the carrier frequency f of the transmission radio wave is set to the resonance frequency of the first resonance circuit 1 at the time when the object to be measured is at a specific temperature, it is possible to determine that the temperature of the object to be measured is equal to or higher than the specific temperature when the quadrature phase amplitude of the response radio wave is equal to or larger than the threshold value 45. Meanwhile, it is possible to determine that the temperature of the object to be measured is lower than the specific temperature when the quadrature phase amplitude of the response radio wave is smaller than the threshold value 45. Accordingly, when it is intended to determine whether or not the temperature of the object to be measured is equal to or higher than the specific temperature, it is appropriate to set the carrier frequency of the transmission radio wave to the resonance frequency of the first resonance circuit 1 at the time when the object to be measured is at the specific temperature.

Thus, in the third embodiment also, in the same manner as in the first embodiment, the temperature of the object to be measured is detected, while the transmission radio wave is transmitted. Therefore, the same effect as obtained in the first embodiment can be obtained.

Further, in the third embodiment, a temperature abnormality in the object to be measured is detected through use of the quadrature phase amplitude. As a result, it is possible to obtain an effect of being able to detect the temperature abnormality through use of only one frequency as the carrier frequency of the transmission radio wave.

In addition, a mere change of the carrier frequency of the transmission radio wave can increase the sensitivity of the detection of a temperature variation, and consequently it is possible to obtain an effect of enabling calibration to be performed through use of software.

The resonance frequencies of the first resonance circuit 1 at the time when the temperature of the object to be measured is normal, when the temperature of the object to be measured is abnormal, and when the object to be measured is at the threshold temperature are measured in advance by, for example, an experiment, and the obtained measurement values are used.

Fourth Embodiment

Figure 6:
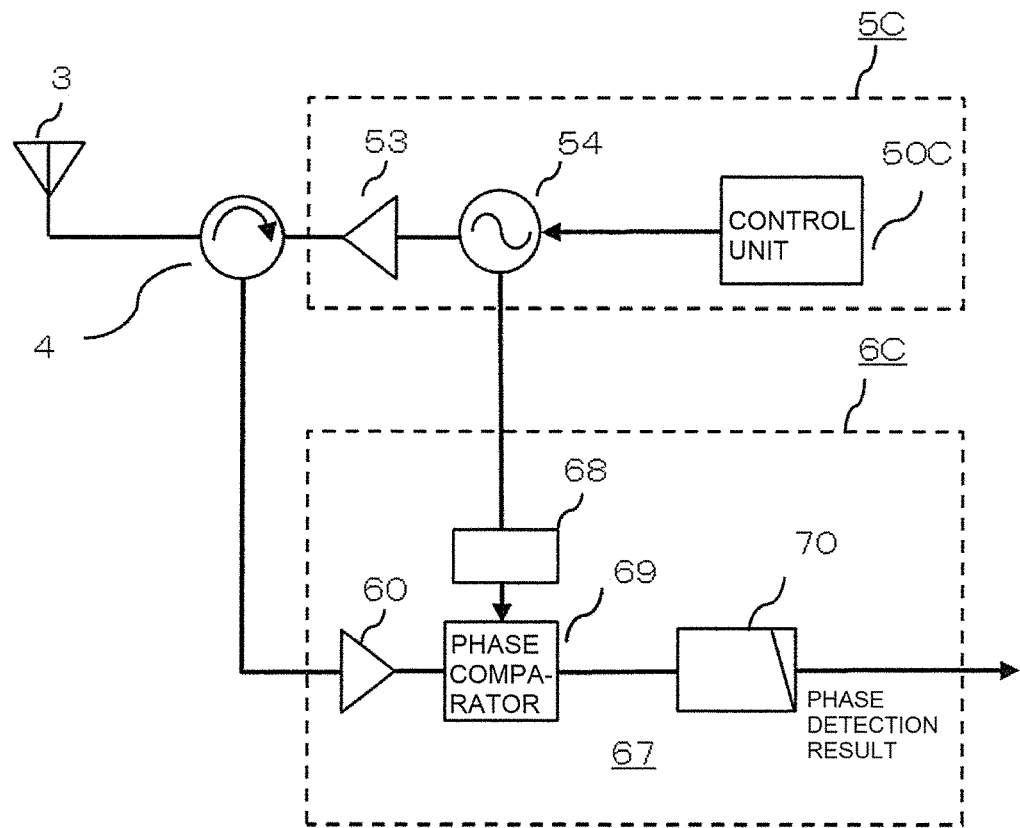
FIG. 6 is a block diagram for illustrating respective configurations of a transmission unit and a reception unit of a detection processing unit in a temperature detection device according to a fourth embodiment of the present invention.

FIG. 6 is a block diagram for illustrating a part of a configuration of the detection processing unit 20 in a temperature detection device according to the fourth embodiment of the present invention. The overall configuration of the temperature detection device according to the fourth embodiment is basically the same as the configuration illustrated in FIG. 1, and accordingly a description thereof is omitted herein. In the fourth embodiment, a reception unit 6C of the detection processing unit 20 calculates only a phase of a response radio wave.

In FIG. 6, of the configuration of the detection processing unit 20, only configurations of the second antenna 3, a transmission unit 5C, and the reception unit 6C are illustrated. The transmission unit 5C and the reception unit 6C are provided instead of the transmission unit 5 and the reception unit 6 of FIG. 1, and perform operations different from those to be performed by the transmission unit 5 and the reception unit 6.

As illustrated in FIG. 6, in the fourth embodiment, the transmission unit 5C includes a control unit 50C, the local oscillator 54, and the amplifier 53.

A description is given below of each of the components of the transmission unit 5C.

The control unit 50C controls an operation of the local oscillator 54. The control unit 50C sets a carrier frequency f of a transmission radio wave to be generated from the local oscillator 54.

The local oscillator 54 generates the transmission radio wave having the carrier frequency f set at a present time under the control of the control unit 50C. A method of determining a value of the carrier frequency f is described later with reference to FIG. 7.

The transmission radio wave generated from the local oscillator 54 is input to the amplifier 53. The amplifier 53 amplifies the transmission radio wave and outputs the amplified transmission radio wave.

The second antenna 3 transmits the transmission radio wave amplified by the amplifier 53 toward the first antenna 2 of the temperature sensing unit 10.

Further, as illustrated in FIG. 6, the reception unit 6C includes the amplifier 60 and a phase calculation unit 67.

A description is given below of each of the components of the transmission unit 6C.

The amplifier 60 amplifies the response radio wave received from the temperature sensing unit 10 via the second antenna 3.

When the transmission of the transmission radio wave and the reception of the response radio wave are performed through use of the shared second antenna 3, it is possible to retrieve the response radio wave by using, for example, the circulator 4. Accordingly, as illustrated in FIG. 6, the circulator 4 is connected between the second antenna 3 and each of the transmission unit 5C and the reception unit 6C.

The phase calculation unit 67 calculates a phase of the response radio wave responding to the transmission radio wave. This can be achieved by using a phase comparator used in, for example, a PLL circuit to compare a phase of the transmission radio wave to a phase of the response radio wave and causing a result of the phase comparison to pass through a low-pass filter to calculate a voltage value corresponding to the phases. Accordingly, in the fourth embodiment, as illustrated in FIG. 6, the phase calculation unit 67 includes a phase shifter 68, a phase comparator 69, and a low-pass filter 70. In a method of calculating the phases, first, the response radio wave amplified by the amplifier 60 and the transmission radio wave generated from the local oscillator 54 are input to the phase comparator 69. The transmission radio wave has the phase thereof shifted by the phase shifter 68 to be compared to that of the response radio wave. Thus, the origin of the phase in the phase comparator 69 can be determined through use of the phase shifter 68. The phase comparator 69 compares the phase of the response radio wave to the phase of the transmission radio wave and outputs a result of the phase comparison. Then, the phase comparator 69 inputs the phase comparison result to the low-pass filter 70 and causes the phase comparison result to pass therethrough to obtain the voltage value corresponding to the phases to be obtained.

The phase of the response radio wave calculated by the phase calculation unit 67 is input to the determination unit 7. The determination unit 7 compares the phase to a threshold value stored in advance in the storage unit 8 to determine whether or not the temperature of the object to be measured exceeds a threshold temperature and detect whether the temperature of the object to be measured is abnormal.

As described above, in the fourth embodiment, the calculated phase and the threshold value are compared with each other, to thereby determine whether or not the temperature of the object to be measured exceeds the threshold temperature to detect a temperature abnormality.

Figure 7:
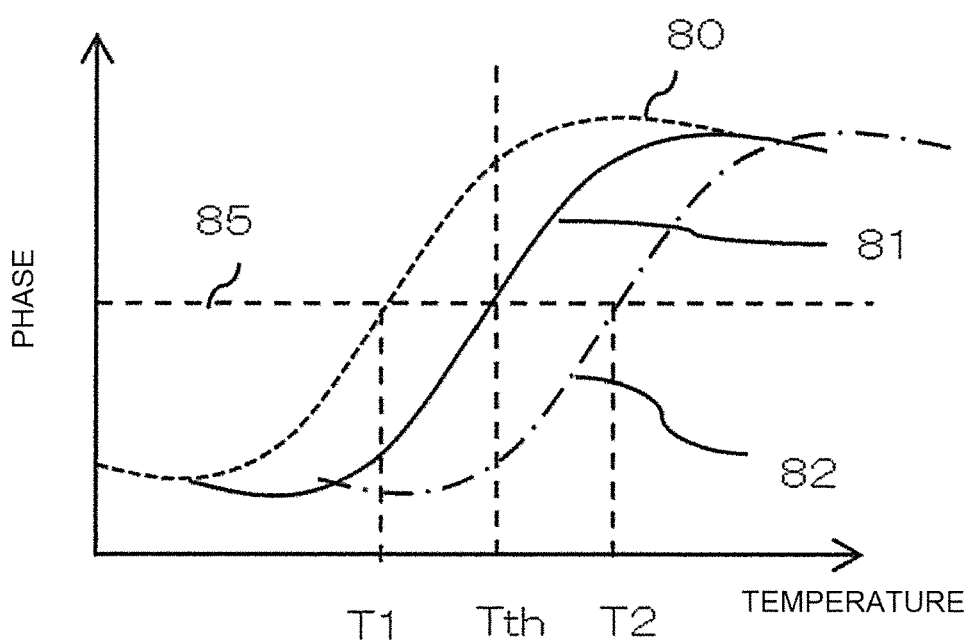
FIG. 7 is a schematic graph for illustrating a method of setting a carrier frequency of a transmission radio wave in the temperature detection device according to the fourth embodiment of the present invention.

Next, referring to FIG. 7, a description is given of a method of determining the carrier frequency f of the transmission radio wave and a temperature detection method based on the phase of the response radio wave in the temperature detection device according to the fourth embodiment. FIG. 7 is a schematic graph for illustrating the method of determining the carrier frequency f and the temperature detection method in the temperature detection device according to the fourth embodiment.

In FIG. 7, the abscissa axis represents a temperature, and the ordinate axis represents the phase of the response radio wave. In FIG. 7, the temperature dependence of the phase of the response radio wave is shown.

The first resonance circuit 1 of the temperature sensing unit 10 has the resonance characteristic that varies depending on the temperature. Accordingly, when, for example, the resonance frequency varies, the phase of the response radio wave responding to the transmission radio wave varies with the temperature, as shown in FIG. 7. In FIG. 7, each of a broken line 80, a solid line 81, and a dot-dash line 82 represents the temperature dependence of the phase at the time when the frequency f of the transmission radio wave is varied.

In the fourth embodiment, as shown in FIG. 7, when the phase exceeds a threshold value 85, it is determined that the temperature of the object to be measured is abnormal and, when the phase is smaller than the threshold value 85, it is determined that the temperature of the object to be measured is normal.

As shown in FIG. 7, there is a region in which the phase greatly varies with a temperature rise and a region in which an amount of the variation of the phase is small. Accordingly, when the threshold value 85 is set correspondingly to the region in which the phase greatly varies, it is possible to clearly determine normality/abnormality and increase the detection sensitivity. However, when the threshold value 85 is set correspondingly to a region other than the region, the amount of the variation of the phase is small. Consequently, the detection sensitivity of the normal/abnormal determination lowers, and erroneous determination may be made in some cases.

However, as shown in FIG. 7, the phase varies with the frequency f of the transmission radio wave. As indicated by the broken line 80, the phase in a case in which the frequency f of the transmission radio wave is set to the resonance frequency at the time when the object to be measured is at the normal temperature greatly varies before and after a temperature T1. Meanwhile, as indicated by the solid line 81, the phase in a case in which the frequency f of the transmission radio wave is set to the resonance frequency at the time when the object to be measured is at the threshold temperature greatly varies before and after a threshold temperature Tth. Meanwhile, as indicated by the dot-dash line 82, the phase in a case in which the frequency f of the transmission radio wave is set to the resonance frequency at the time when the object to be measured is at the abnormal temperature greatly varies before and after a temperature T2. Therefore, it is preferred that the carrier frequency f of the transmission radio wave be varied so that the region in which the phase greatly varies with the temperature of the object to be measured is located just before and after the threshold value 85.

When, in FIG. 7, the frequency f of the transmission radio wave is set to the resonance frequency of the first resonance circuit 1 at the time when the object to be measured is at the normal temperature, the phase varies as indicated by the broken line 80. When the frequency f of the transmission radio wave is set to the resonance frequency of the first resonance circuit 1 at the time when the object to be measured is at the threshold temperature, the phase varies as indicated by the solid line 81. When the frequency f of the transmission radio wave is set to the resonance frequency of the first resonance circuit 1 at the time when the object to be measured is at the abnormal temperature, the phase varies as indicated by the dot-dash line 82.

When the carrier frequency f of the transmission radio wave is thus detuned in a negative direction or in a positive direction from the resonance frequency of the first resonance circuit 1 at the threshold temperature, the temperature dependence varies as shown in FIG. 7. As a result, it is possible to change the temperature at which the transmission radio wave resonates with the first resonance circuit 1. Accordingly, as shown in FIG. 7, by changing the carrier frequency f of the transmission radio wave, it is possible to change the temperature at which the phase greatly varies. Specifically, when the carrier frequency f of the transmission radio wave is detuned in the negative direction, the phase greatly varies at the temperature T1 and, when the carrier frequency f of the transmission radio wave is detuned in the positive direction, the phase greatly varies at the temperature T2.

In summary, in the fourth embodiment, in a case in which the carrier frequency f of the transmission radio wave is set to the resonance frequency of the first resonance circuit 1 at the time when the object to be measured is at a specific temperature, it is possible to determine that the temperature of the object to be measured is equal to or higher than the specific temperature when the phase of the response radio wave is equal to or larger than the threshold value 85. Meanwhile, it is possible to determine that the temperature of the object to be measured is lower than the specific temperature when the phase of the response radio wave is smaller than the threshold value 85. Accordingly, when it is intended to determine whether or not the temperature of the object to be measured is equal to or higher than the specific temperature, it is appropriate to set the carrier frequency of the transmission radio wave to the resonance frequency of the first resonance circuit 1 at the time when the object to be measured is at the specific temperature.

As described above, in the fourth embodiment, by setting the carrier frequency f of the transmission radio wave to the resonance frequency of the first resonance circuit 1 at the time when the object to be measured is at the normal temperature, it is possible to increase the sensitivity of the detection of a temperature variation at the time when the object to be measured is at the normal temperature.

Moreover, by setting the carrier frequency f of the transmission radio wave to the resonance frequency of the first resonance circuit 1 at the time when the object to be measured is at the abnormal temperature, it is possible to increase the sensitivity of the detection of a temperature variation at the time when the object to be measured is at the abnormal temperature.

Moreover, by setting the carrier frequency f of the transmission radio wave to the resonance frequency of the first resonance circuit 1 at the time when the object to be measured is at the threshold temperature, it is possible to increase the sensitivity of the detection of a temperature variation at the time when the object to be measured is at the threshold temperature. Further, in this case, it is possible to easily determine whether a measured temperature of the object to be measured exceeds the threshold temperature.

Thus, in the fourth embodiment also, in the same manner as in the first embodiment, the temperature of the object to be measured is detected, while the transmission radio wave is transmitted. Therefore, the same effect as obtained in the first embodiment can be obtained.

Further, in the fourth embodiment, a temperature abnormality in the object to be measured is detected through use of the phase of the response radio wave. As a result, it is possible to obtain an effect of being able to detect the temperature abnormality through use of only one frequency as the carrier frequency of the transmission radio wave. In addition, it is possible to obtain an effect of remaining unaffected by a variation in the intensity of the transmission radio wave even when the intensity of the transmission radio wave varies. Moreover, the phase responds to a rise in the temperature of the object to be measured in a period of time shorter than that in which the amplitude responds to the rise in the temperature of the object to be measured. Accordingly, it is possible to obtain an effect of being able to further reduce a transmission/reception time to further increase a speed of the temperature detection process.

The resonance frequencies of the first resonance circuit 1 at the time when the temperature of the object to be measured is normal, when the temperature of the object to be measured is abnormal, and when the object to be measured is at the threshold temperature are measured in advance by, for example, an experiment, and the obtained measurement values are used.

Fifth Embodiment

Figure 8A:
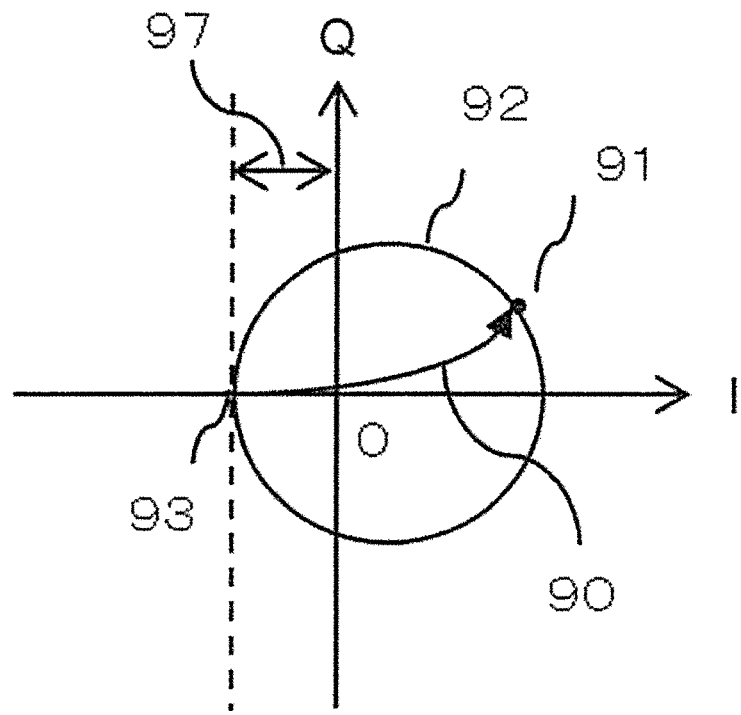
FIG. 8A is a schematic graph for illustrating a correction method for correcting an offset error of a response radio wave in a temperature detection method according to a fifth embodiment of the present invention.
Figure 8B:
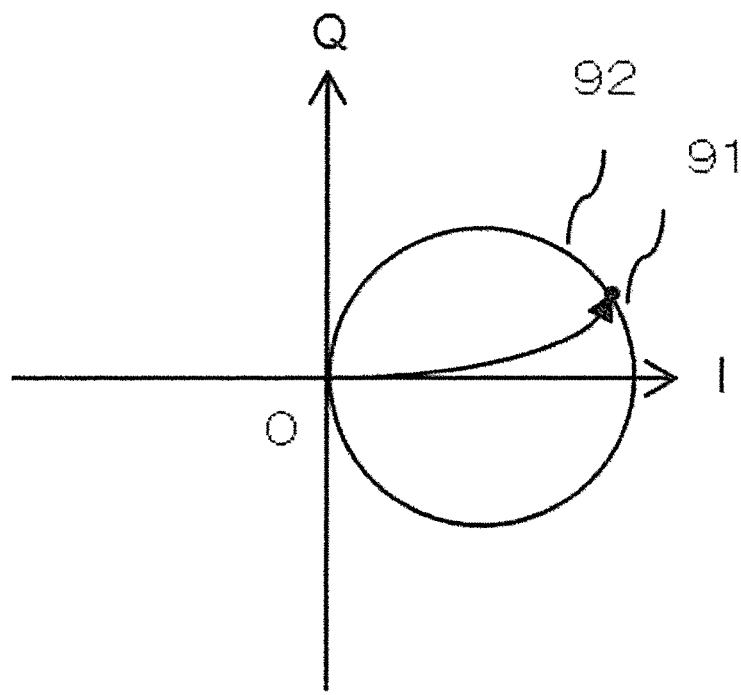
FIG. 8B is a schematic graph for illustrating the correction method for correcting the offset error of the response radio wave in the temperature detection method according to the fifth embodiment of the present invention.
Figure 8C:
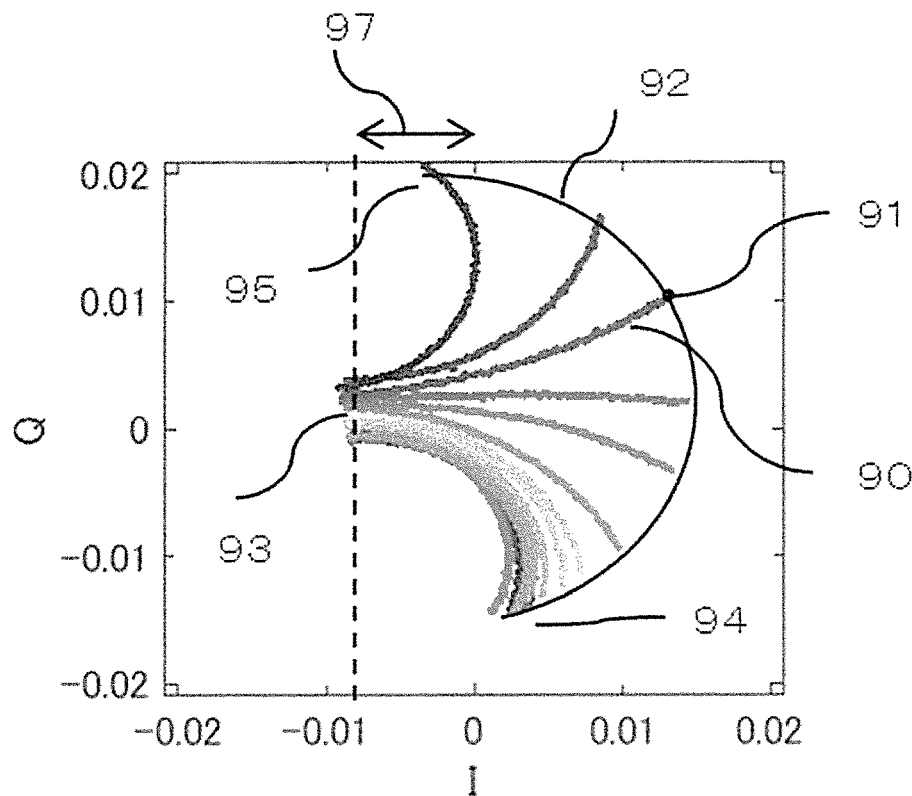
FIG. 8C is a schematic graph for illustrating the correction method for correcting the offset error of the response radio wave in the temperature detection method according to the fifth embodiment of the present invention.

In the fifth embodiment, a description is given of a method of correcting an offset error of the response radio wave in the temperature detection device according to the third embodiment described above. FIG. 8A to FIG. 8C are schematic graphs for illustrating the method of correcting the offset error of the response radio wave in the fifth embodiment. In each of FIG. 8A to FIG. 8C, the ordinate axis represents the amplitude of the quadrature-phase component of the response radio wave, namely, the Q-component, and the abscissa axis represents an amplitude of the in-phase component of the response radio wave, namely, an I-component. The Q-component and the I-component are orthogonal waveforms having a phase difference of 90 degrees.

FIG. 8A shows a locus 90 of the quadrature phase amplitude of the response radio wave in a case in which a transmission radio wave having the specific frequency f is transmitted when the object to be measured is at a specific temperature. The locus 90 is a locus from a time at which the transmission of the transmission radio wave is started to a time at which the transmission is ended. In FIG. 8A, a reference numeral 91 denotes an ending point $P_{END}$ of the locus 90. The ending point $P_{END}$ of the locus 90 denoted by the reference numeral 91 varies along a movement curve 92 on an IQ plane when the temperature of the object to be measured varies from a lower temperature to a higher temperature.

FIG. 8C is a graph for illustrating an example of the movement curve 92. In FIG. 8C, a reference numeral 93 denotes a starting point $P_{START}$ of the locus 90. The locus 90 represents a locus at the time when the object to be measured is at a specific temperature, for example, 160° C. A locus 94 represents a locus at the time when the object to be measured is at a temperature lower than the specific temperature. A locus 95 represents a locus at the time when the object to be measured is at a temperature higher than the specific temperature.

In the detection processing unit 20, when electrical isolation between the transmission unit 5 and the reception unit 6 is insufficient, the transmission radio wave may leak from the transmission unit 5 toward the reception unit 6. In that case, as shown in FIG. 8A, in a result of calculation of the quadrature phase amplitude, an offset error 97 is observed.

Accordingly, in the fifth embodiment, the offset error 97 is calculated based on the quadrature phase amplitude after a lapse of a preset given period of time from the start of the transmission of the transmission radio wave, and the quadrature phase amplitude is corrected based on the offset error 97. FIG. 8B shows a post-correction quadrature phase amplitude after the offset error of the quadrature phase amplitude of FIG. 8A was corrected.

For example, a method of calculating the offset error is as follows. Referring to FIG. 8C, a description is given of the method. It is assumed that the temperature of the object to be measured gradually increases from the lower temperature and, after a lapse of the preset given period of time from the start of the transmission of the transmission radio wave, the object to be measured reaches the specific temperature. A locus obtained at this time is determined to be the locus 90. A value of the I-component at the starting point $P_{START}$ of the locus 90 is "−0.01". Accordingly, it is sufficient that the starting point $P_{START}$ of the locus 90 is shifted in a positive direction along the I-axis and becomes "0". Consequently, the calculated offset value is "−0.01", and the offset error 97 is "0.01" equivalent to an absolute value of a difference between "−0.01" and "0".

As a result, when the movement curve 92 of FIG. 8A is shifted by the offset error 97 in the positive direction along the I-axis, a result of the correction of FIG. 8B is obtained.

Thus, in the fifth embodiment, the same effect as obtained in the third embodiment described above can be obtained.

Further, in the fifth embodiment, even when an offset error is observed in the value of the quadrature phase amplitude obtained in the third embodiment for any reason, for example, leakage of the transmission radio wave, the offset error can be corrected by the correction method described above. Accordingly, it is possible to improve the accuracy of measurement of the quadrature phase amplitude in the third embodiment. As a result, it is possible to obtain an effect of being able to improve the accuracy of measurement of the detected temperature of the object to be measured.

Moreover, even when the offset error 97 varies under the influence of, for example, a variation with time or an environmental variation, by calculating the offset error 97 again, it is possible to obtain the effect of being able to prevent degradation of the accuracy of measurement of the quadrature phase amplitude.

In addition, for the measurement of the offset error 97, the configuration of the reception unit 6B illustrated in FIG. 4 can be used without any alteration. Therefore, it is also possible to obtain an effect of eliminating the requirement for special reception hardware for the correction of the offset error.

Sixth Embodiment

Figure 9:
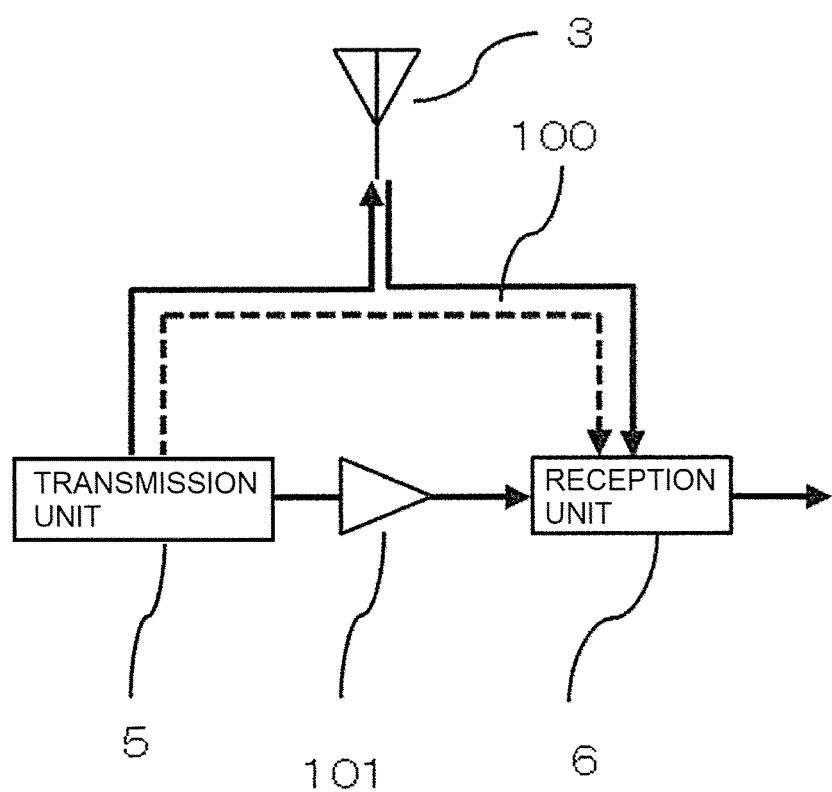
FIG. 9 is a block diagram for illustrating a correction method for correcting an offset error of a response radio wave in a temperature detection method according to a sixth embodiment of the present invention.

In the sixth embodiment of the present invention, a description is given of a method of correcting an offset error of the response radio wave in the temperature detection device according to the first, third, and fourth embodiments described above. FIG. 9 is a block diagram for illustrating the method of correcting the offset error of the response radio wave in the sixth embodiment. In FIG. 9, an offset correction unit 101 is provided between the transmission unit 5 and the reception unit 6. The offset correction unit 101 includes an attenuator and a phase shifter.

A description is given below on the assumption that the transmission unit 5 and the reception unit 6 are provided. However, the sixth embodiment is applicable to any one of the transmission units 5B and 5C in the third embodiment, and the reception units 6B and 6C in the fourth embodiment.

As described above in the fifth embodiment, when electrical isolation between the transmission unit 5 and the reception unit 6 is insufficient, the transmission radio wave leaks from the transmission unit 5 toward the reception unit 6, like a leakage radio wave 100 illustrated in FIG. 9, resulting in an offset error. For the offset error 97, FIG. 8A to FIG. 8C are referred to, and a description thereof is omitted herein.

In the fifth embodiment described above, the offset error 97 is calculated but, in the sixth embodiment, a description is given of a case in which a value of the offset error 97 is known in advance depending on a hardware configuration.

When the value of the offset error 97 is known in advance depending on the hardware configuration, the offset correction unit 101 causes the attenuator to adjust an amount of attenuation of the transmission radio wave so as to cancel out the leakage radio wave 100, causes the phase shifter to adjust a phase of the transmission radio wave, and inputs the transmission radio wave to the reception unit 6. Consequently, the leakage radio wave 100 is canceled out. As a result, it is possible to reduce the offset error.

In the sixth embodiment, the reception unit 6 uses the offset correction unit 101 to correct the offset error through use of hardware. As a result, it is possible to improve the accuracy of measurement of the amplitude and the phase without placing a software-induced calculation load on, for example, a CPU, and improve the measurement accuracy of temperature detection.

In addition to the correction of the offset error in the sixth embodiment, the correction of the offset error in the second embodiment described above may also be performed. In that case, it is possible to reduce the offset error through use of both of software and hardware. As a result, it is possible to obtain an effect of being able to further improve the accuracy of measurement of, for example, the phase, the amplitude, and the quadrature phase amplitude and further improve the accuracy of measurement of the detected temperature of the object to be measured.

Seventh Embodiment

Figure 10A:
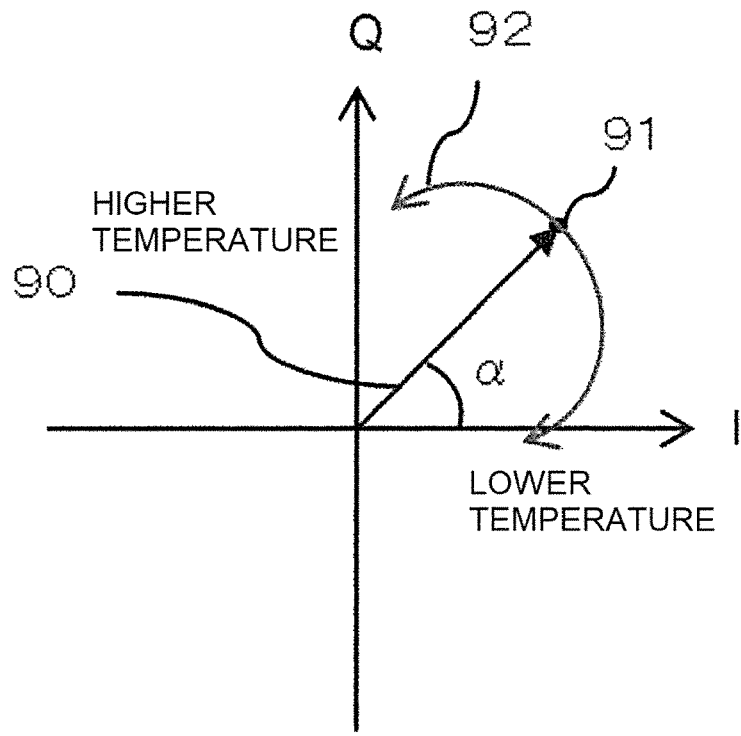
FIG. 10A is a schematic graph for illustrating a correction method for correcting a phase of a response radio wave in a temperature detection method according to a seventh embodiment of the present invention.
Figure 10B:
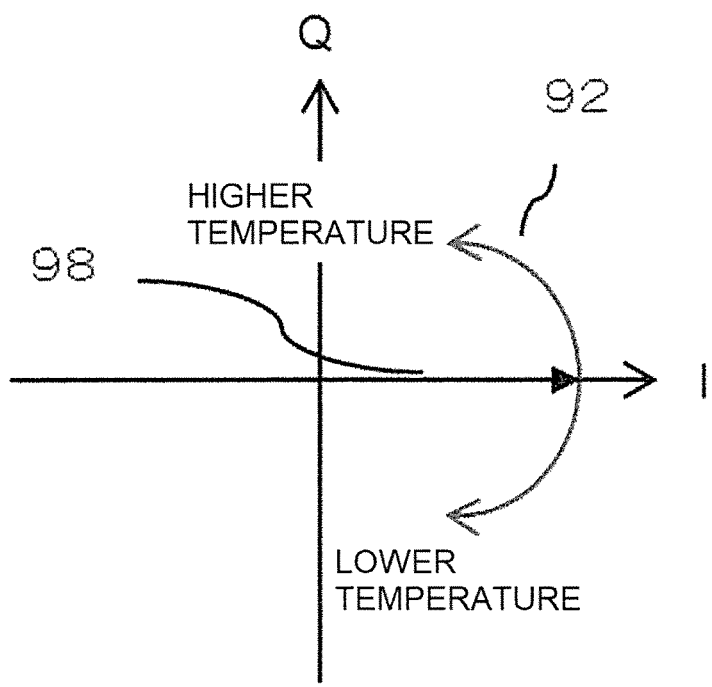
FIG. 10B is a schematic graph for illustrating the correction method for correcting the phase of the response radio wave in the temperature detection method according to the seventh embodiment of the present invention.

In the seventh embodiment of the present invention, a description is given of a method of correcting the phase of the response radio wave in the temperature detection device according to the first embodiment and the fourth embodiment described above. FIG. 10A and FIG. 10B are schematic graphs for illustrating the method of correcting the phase of the response radio wave in the seventh embodiment. In each of FIG. 10A and FIG. 10B, the ordinate axis represents the amplitude of the quadrature-phase component of the response radio wave, namely, the Q-component, and the abscissa axis represents an amplitude of the in-phase component of the response radio wave, namely, an I-component. The Q-component and the I-component are orthogonal waveforms having a phase difference of 90 degrees.

A description is given below on the assumption that the transmission unit 5 and the reception unit 6 are provided. However, the seventh embodiment is applicable to any one of the transmission unit 5C and the reception unit 6C in the fourth embodiment.

FIG. 10A shows, in the same manner as in FIG. 8A, a locus 90 of the quadrature phase amplitude of the response radio wave in a case in which a transmission radio wave having the specific carrier frequency f is transmitted when the object to be measured is at a specific temperature. The locus 90 is a locus from a time at which the transmission of the transmission radio wave is started to a time at which the transmission is ended. In FIG. 10A, a reference numeral 91 denotes an ending point $P_{END}$ of the locus 90. The ending point $P_{END}$ of the locus 90 denoted by the reference numeral 91 varies along a movement curve on an IQ plane when the temperature of the object to be measured varies from a lower temperature to a higher temperature.

A direction of the locus 90 at the time when the first resonance circuit 1 is resonating corresponds to the positive direction along the I-axis on the IQ plane, like the direction of the locus 98 of FIG. 10B.

However, due to, for example, a distance between the first antenna 2 and the second antenna 3, there may be a case in which a propagation delay of the response radio wave varies, and a coordinate system of the IQ plane rotates depending on the carrier frequency f. As a result, as shown in FIG. 10A, the direction of the locus 90 of the quadrature phase amplitude at the time when the first resonance circuit 1 is resonating is displaced by an angle α from an originally intended direction, for example, the positive direction along the I-axis.

Accordingly, in the seventh embodiment, the value of the frequency f is set so as to cause the first resonance circuit 1 to resonate at a specific temperature, and transmission of the transmission radio wave is started. Then, when a preset given period of time elapses from the start of the transmission of the transmission radio wave, the direction of the locus 90 on the IQ plane is determined. Then, the angle α between the direction of the locus 90 and the positive direction along the I-axis is determined. Based on the determined angle α, the coordinate system is rotated by the angle α so that the direction of the locus 90 is matched with the positive direction along the I-axis. As a result, as shown in FIG. 10B, the locus 90 of the quadrature phase amplitude at the time when the first resonance circuit 1 is resonating becomes the positive direction along the I-axis, as represented by the locus 98. In the seventh embodiment, the angle α between the locus 90 of the quadrature phase amplitude when the first resonance circuit 1 is resonating and the I-axis is thus used as a correction value for the phase to rotate the coordinate system, to thereby correct the phase of the response radio wave.

As described above, in the seventh embodiment, the locus 90 of the quadrature phase amplitude at the time when the first resonance circuit 1 is resonating is used as the correction value for the phase to rotate the coordinate system, to thereby correct the phase of the response radio wave. As a result, even when the phase is varied under the influence of a variation with time or an environmental variation, by calculating again the correction value for the phase, it is possible to improve the accuracy of the quadrature phase amplitude and consequently improve the accuracy of measurement of the detected temperature.

Eighth Embodiment

Figure 11A:
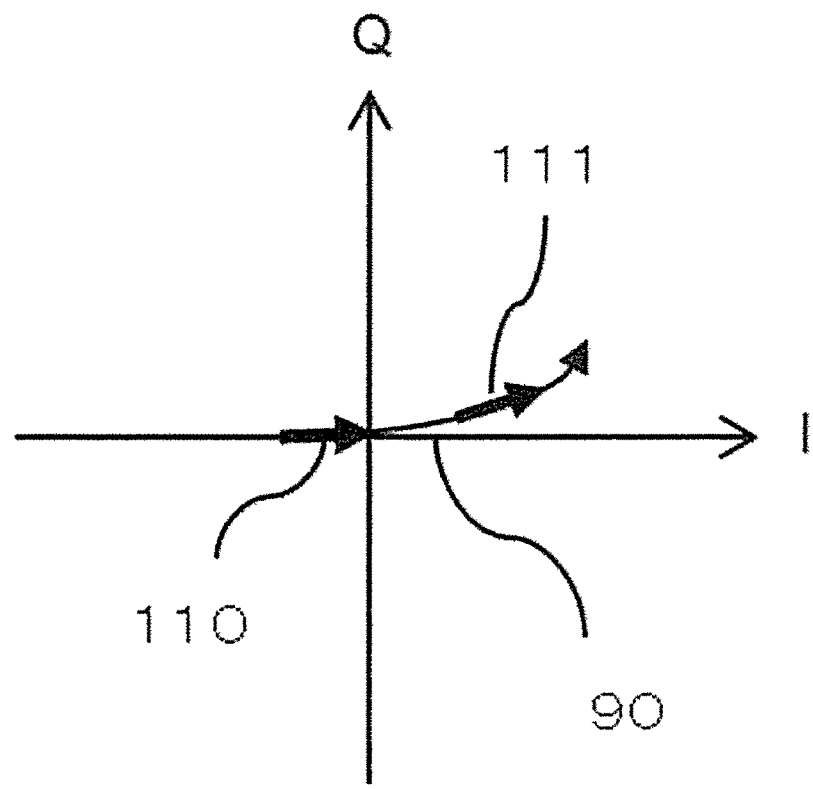
FIG. 11A is a schematic graph for illustrating a temperature detection method according to an eighth embodiment of the present invention.

In the eighth embodiment of the present invention, a description is given of a method of detecting, in the temperature detection device according to the third embodiment described above, the temperature of the object to be measured from a locus of the quadrature phase amplitude of the response radio wave without being affected by the offset error and phase. FIG. 11A is a schematic graph for illustrating the temperature detection method according to the eighth embodiment. In FIG. 11A, the ordinate axis represents the amplitude of the quadrature-phase component of the response radio wave, namely, the Q-component, and the abscissa axis represents an amplitude of the in-phase component of the response radio wave, namely, an I-component. The Q-component and the I-component are orthogonal waveforms having a phase difference of 90 degrees.

FIG. 11A shows, in the same manner as in FIG. 8A, a locus 90 of the quadrature phase amplitude of the response radio wave in a case in which a transmission radio wave having the specific frequency f is transmitted when the object to be measured is at a specific temperature. The locus 90 is a locus from a time at which the transmission of the transmission radio wave is started to a time at which the transmission is ended.

In the eighth embodiment, from the locus 90, two movement vectors v1 and v2 are obtained. In FIG. 11A, a reference numeral 110 denotes the movement vector v1, and a reference numeral 111 denotes the movement vector v2.

Figure 11B:
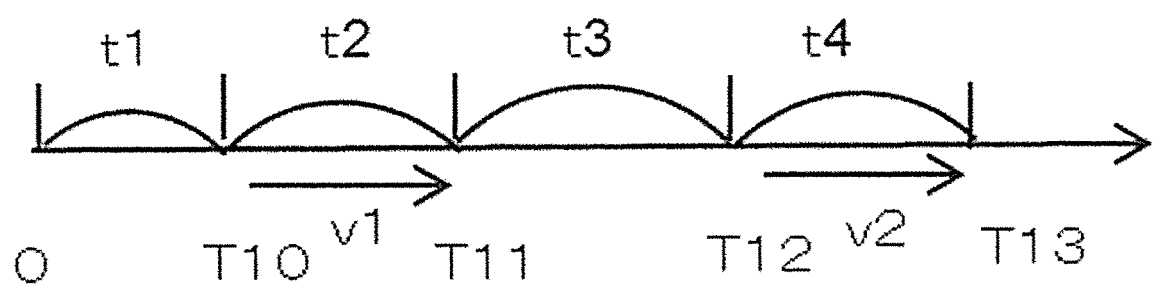
FIG. 11B is a schematic graph for illustrating the temperature detection method according to the eighth embodiment of the present invention.

Referring to FIG. 11B, a description is given of a method of setting times serving as starting points and ending points of the movement vector v1 and the movement vector v2. In FIG. 11B, the abscissa axis represents time.

For example, as shown in FIG. 11B, when it is assumed that a transmission start time for the transmission radio wave is a time 0, a time after a lapse of a preset time period t1 from the time 0 is a time T10, and a time after a lapse of a preset time period t2 from the time T10 is a time T11, the movement vector v1 is a movement vector exhibiting the locus of the quadrature phase amplitude of the response radio wave having the starting point at the time T10 and the ending point at the time T11. The time t1 may also be set to 0. In that case, the starting point of the movement vector v1 is at the time 0.

Similarly, when it is assumed that a time after a lapse of a preset time period t3 from the time T11 is a time T12, and a time after a lapse of a preset time period t4 from the time T12 is a time T13, the movement vector v2 is a movement vector exhibiting the locus of the quadrature phase amplitude of the response radio wave having the starting point at the time T12 and the ending point at the time T13.

In the eighth embodiment, the starting points and the ending points of the movement vector v1 and the movement vector v2 are thus set and, as shown in FIG. 11A, the movement vectors v1 and v2 are determined on the IQ plane.

Next, a cross product of the two movement vectors v1 and v2 on the IQ plane is determined, and the temperature of the object to be measured is detected based on the cross product.

The magnitude of the cross product of the two movement vectors V1 and v2 is equivalent to the Q-component of the movement vector v2 on the IQ plane in which the positive direction along the I-axis is newly oriented in the direction of the movement vector v1 and corresponds to the quadrature phase amplitude of the response radio wave. Accordingly, the Q-component of the movement vector v2 can be measured through use of the cross product. When it is conceived that the starting point of the movement vector v2 is an offset error, the concept is equivalent to correcting the offset error and the phase and measuring the Q-component.

By thus obtaining the Q-component and performing the same process as that performed in the third embodiment described above through use of the Q-component as the quadrature phase amplitude of the response radio wave, it is possible to detect whether or not the temperature of the object to be measured is abnormal.

Note that, in the description given above, the cross product of the two movement vectors v1 and v2 is determined, but the eighth embodiment is not limited to that case. It may also be possible to determine an angle formed between the two movement vectors v1 and v2, calculate the phase of the response radio wave based on the angle, and perform the same process as that performed in the fourth embodiment described above, to thereby detect the temperature of the object to be measured.

As described above, in the eighth embodiment, the temperature of the object to be measured is detected based on the cross product of the movement vector v1 on the IQ plane during a given period of time and the movement vector v2 on the IQ plane during a subsequent given period of time after a lapse of a given period of time, or on the angle formed between the two movement vectors v1 and v2. Accordingly, it is possible to correct the offset error and the phase. Therefore, it is possible to cancel out influence of a variation with time or an environmental variation by calibration. Further, it is possible to measure and calibrate the phase through use of the reception unit 6.

REFERENCE SIGNS LIST

1 first resonance circuit, 2 first antenna, 3 second antenna, 5, 5A, 5B, 5C transmission unit, 6, 6A, 6B, 6C reception unit, 7 determination unit, 8 storage unit, 10 temperature sensing unit, 20 detection processing unit, 45, 85 threshold value, 50, 50B, 50C control unit, 51, 52, 54 local oscillator, amplifier, 60 amplifier, 61 frequency separator, 62, 63 amplitude calculation unit, 64 quadrature phase amplitude calculation unit, 65 mixer, 66, 70 low-pass filter, 67 phase calculation unit, 68 phase shifter, 69 phase comparator, 90, 94, 95 locus, 97 offset error, 100 leakage radio wave, 101 offset correction unit

The invention claimed is:

1. A temperature detection device, comprising:
a detection processor configured to transmit, when detecting a temperature of an object to be measured, a transmission radio wave, simultaneously receive a response radio wave corresponding to the transmission radio wave, and to detect whether the temperature of the object to be measured is normal or abnormal based on the response radio wave; and
a temperature sensor configured to receive the transmission radio wave and transmit the response radio wave responding to the transmission radio wave,
the temperature sensor including:
a resonance circuit, which has a temperature characteristic that varies depending on the temperature of the object to be measured, and is configured to be excited by the transmission radio wave from the detection processor to generate the response radio wave responding to the transmission radio wave as a response radio wave on which the temperature characteristic is reflected; and
a first antenna configured to transmit the response radio wave generated from the resonance circuit to the detection processor,
the detection processor including:
a second antenna configured to transmit the transmission radio wave to the temperature sensor and to receive the response radio wave from the temperature sensor;
a transmitter configured to generate the transmission radio wave to be transmitted from the second antenna;
a receiver configured to calculate at least any one of amplitude, phase, and quadrature phase amplitude of the response radio wave received by the second antenna to output the result of the calculation; and
a determiner configured to compare the temperature of the object to be measured based on the calculation result received from the receiver with a temperature determined in advance.

2. The temperature detection device according to claim 1,
wherein the transmitter includes a local oscillator configured to generate, as the transmission radio wave, a first transmission radio wave of a first carrier frequency corresponding to a value of a resonance frequency of the resonance circuit at a time when the temperature of the object to be measured is lower than a preset threshold temperature, and a second transmission radio wave of a second carrier frequency corresponding to a value of the resonance frequency of the resonance circuit at a time when the temperature of the object to be measured is higher than the threshold temperature,
wherein the receiver includes:
a frequency separator configured to separate the response radio wave into a first response radio wave of the first carrier frequency and a second response radio wave of the second carrier frequency, respectively, to output the respective response radio waves;
a first amplitude calculator configured to calculate an amplitude of the first response radio wave output from the frequency separator; and
a second amplitude calculator configured to calculate an amplitude of the second response radio wave output from the frequency separator, and
wherein the determiner is configured to:
determine that the temperature of the object to be measured is lower than the threshold temperature and normal when the amplitude of the first response radio wave calculated by the first amplitude calculator is larger than the amplitude of the second response radio wave calculated by the second amplitude calculator;
determine that the temperature of the object to be measured is higher than the threshold temperature and abnormal when the amplitude of the first response radio wave calculated by the first amplitude calculator is smaller than the amplitude of the second response radio wave calculated by the second amplitude calculator; and determine that the temperature of the object to be measured is equal to the threshold temperature when a difference between the amplitude of the first response radio wave calculated by the first amplitude calculator and the amplitude of the second response radio wave calculated by the second amplitude calculator is smaller than a first threshold value determined in advance.

3. The temperature detection device according to claim 1, wherein the transmitter includes a local oscillator configured to generate the transmission radio wave of a carrier frequency corresponding to a value of a resonance frequency of the resonance circuit at a time when the temperature of the object to be measured is a specific temperature, wherein the receiver includes a quadrature phase amplitude calculator configured to calculate the quadrature phase amplitude of the response radio wave based on the transmission radio wave input thereto from the local oscillator of the transmitter and on the response radio wave received with the second antenna from the temperature sensor, wherein the detection processor further includes a memory configured to store a second threshold value to be compared to the quadrature phase amplitude of the response radio wave calculated by the quadrature phase amplitude calculator, and wherein the determiner is configured to:

determine that the temperature of the object to be measured is lower than the specific temperature when the quadrature phase amplitude of the response radio wave calculated by the quadrature phase amplitude calculator is smaller than the second threshold value stored in the memory; and determine that the temperature of the object to be measured is equal to or higher than the specific temperature when the quadrature phase amplitude of the response radio wave calculated by the quadrature phase amplitude calculator is equal to or larger than the second threshold value.

4. The temperature detection device according to claim 3, wherein, when a value of an offset error resulting from a leakage radio wave from the transmitter to the receiver is known in advance, the detection processor further includes an offset corrector, which is provided between the local oscillator of the transmitter and the receiver, and is configured to adjust, based on the offset error, an amount of attenuation and phase of the transmission radio wave, which are input from the local oscillator of the transmitter to the receiver.

5. The temperature detection device according to claim 1, wherein the transmitter includes a local oscillator configured to generate the transmission radio wave of a carrier frequency corresponding to a value of a resonance frequency of the resonance circuit at a time when the temperature of the object to be measured is a specific temperature, wherein the receiver includes a phase calculator configured to calculate the phase of the response radio wave based on the transmission radio wave input thereto from the local oscillator of the transmitter and on the response radio wave received with the second antenna from the temperature sensor, wherein the detection processor further includes a memory configured to store a third threshold value to be compared to the phase of the response radio wave calculated by the phase calculator, and wherein the determiner is configured to:

determine that the temperature of the object to be measured is lower than the specific temperature when the phase of the response radio wave calculated by the phase calculator is smaller than the third threshold value stored in the memory; and determine that the temperature of the object to be measured is equal to or higher than the specific temperature when the phase of the response radio wave calculated by the phase calculator is equal to or larger than the third threshold value.

6. The temperature detection device according to claim 5, wherein, when a value of an offset error resulting from a leakage radio wave from the transmitter to the receiver is known in advance, the detection processor further includes an offset corrector, which is provided between the local oscillator of the transmitter and the receiver, and is configured to adjust, based on the offset error, an amount of attenuation and phase of the transmission radio wave, which are input from the local oscillator of the transmitter to the receiver.

7. The temperature detection device of claim 1, wherein the temperature characteristic is configured with a detection sensitivity to provide a small variation in a normal temperature region and a rapid variation in an abnormal temperature region.

8. A temperature detection method, comprising:

a first transmission step of transmitting a transmission radio wave;

an excitation step of receiving the transmission radio wave and exciting, through use of the transmission radio wave, a resonance circuit having a temperature characteristic that varies depending on a temperature of an object to be measured;

a second transmission step of causing the excited resonance circuit to generate a response radio wave responding to the transmission radio wave and transmitting the response radio wave;

a reception step of receiving the response radio wave;

a calculation step of calculating at least any one of amplitude, phase, and quadrature phase amplitude of the received response radio wave to output the result of the calculation; and a determination step of determining, based on the calculation result, whether the temperature of the object to be measured is normal or abnormal, the transmission of the transmission radio wave in the first transmission step and the reception of the response radio wave in the reception step being performed in parallel.

9. The temperature detection method according to claim 8, wherein the calculation step includes:

calculating the quadrature phase amplitude of the response radio wave;

determining, on an IQ plane, a locus of the quadrature phase amplitude of the response radio wave from a time at which the transmission of the transmission radio wave is started to a time at which the transmission is ended;

determining an offset error-correction value for the quadrature phase amplitude of the response radio wave based on a difference between a starting point of the locus and an origin of an I-axis; and correcting an offset error of the quadrature phase amplitude of the response radio wave based on the offset error-correction value to output, as the calculation result, the quadrature phase amplitude of the response radio wave after the correction.

10. The temperature detection method according to claim 8, wherein the calculation step includes:
calculating the phase and the quadrature phase amplitude of the response radio wave;
determining, on an IQ plane, a locus of the quadrature phase amplitude of the response radio wave from a time at which the transmission of the transmission radio wave is started to a time at which the transmission is ended;
determining an angle between a direction of the locus and a positive direction along an I-axis; and
rotating a coordinate system in the IQ plane based on the angle to match the direction of the locus with the positive direction along the I-axis, to thereby correct the phase of the response radio wave to output the corrected phase as the calculation result.

11. The temperature detection method according to claim 8, wherein the calculation step includes:
calculating the quadrature phase amplitude of the response radio wave;
determining, on an IQ plane, a locus of the quadrature phase amplitude of the response radio wave from a time at which the transmission of the transmission radio wave is started to a time at which the transmission is ended;
determining a cross product of a movement vector representing a part of the locus between a first time and a second time and a movement vector representing a part of the locus between a third time after a lapse of a given period of time from the second time and a fourth time; and
determining, based on the cross product, the quadrature phase amplitude of the response radio wave to output the quadrature phase amplitude as the calculation result.

12. The temperature detection method according to claim 8, wherein the calculation step includes:
calculating the quadrature phase amplitude of the response radio wave;
determining, on an IQ plane, a locus of the quadrature phase amplitude of the response radio wave from a time at which the transmission of the transmission radio wave is started to a time at which the transmission is ended;
determining an angle formed between a movement vector representing a part of the locus between a first time and a second time and a movement vector representing a part of the locus between a third time after a lapse of a given period of time from the second time and a fourth time; and
determining, based on the angle, the phase of the response radio wave to output the phase as the calculation result.

13. A temperature detection device, comprising:
a detection processor configured to transmit, when detecting a temperature of an object to be measured, a transmission radio wave with an amount of attenuation and phase of the transmission radio wave adjusted based on an offset error, simultaneously receive a response radio wave corresponding to the transmission radio wave, and to detect whether the temperature of the object to be measured is normal or abnormal based on the response radio wave; and
a temperature sensor configured to receive the transmission radio wave and transmit the response radio wave responding to the transmission radio wave,
the temperature sensor including:
a resonance circuit, which has a temperature characteristic that varies depending on the temperature of the object to be measured, and is configured to be excited by the transmission radio wave from the detection processor to generate the response radio wave responding to the transmission radio wave as a response radio wave on which the temperature characteristic is reflected; and
a first antenna configured to transmit the response radio wave generated from the resonance circuit to the detection processor,
the detection processor including:
a second antenna configured to transmit the transmission radio wave to the temperature sensor and to receive the response radio wave from the temperature sensor;
a transmitter configured to generate the transmission radio wave to be transmitted from the second antenna;
a receiver configured to calculate at least any one of amplitude, phase, and quadrature phase amplitude of the response radio wave received by the second antenna to output the result of the calculation; and
a determiner configured to compare the temperature of the object to be measured based on the calculation result received from the receiver with a temperature determined in advance.

* * * * *